US007134081B2

(12) United States Patent
Fuller, III et al.

(10) Patent No.: US 7,134,081 B2
(45) Date of Patent: Nov. 7, 2006

(54) METHOD AND APPARATUS FOR CONTROLLING AN INSTRUMENTATION SYSTEM

(75) Inventors: David W Fuller, III, Austin, TX (US); Christopher G. Cifra, Austin, TX (US); Thomas V. Connell, Jr., Austin, TX (US)

(73) Assignee: National Instruments Corporation, Austin, TX (US)

( * ) Notice: Subject to any disclaimer, the term of this patent is extended or adjusted under 35 U.S.C. 154(b) by 648 days.

(21) Appl. No.: 10/103,391

(22) Filed: Mar. 21, 2002

(65) Prior Publication Data

US 2003/0035008 A1 Feb. 20, 2003

Related U.S. Application Data

(60) Provisional application No. 60/312,257, filed on Aug. 14, 2001.

(51) Int. Cl.
*G06F 13/00* (2006.01)
*G06F 15/00* (2006.01)
(52) U.S. Cl. .................. 715/735; 714/712; 715/763
(58) Field of Classification Search ................ 715/763, 715/765, 853, 771, 735, 736, 737; 714/712, 714/738, 718
See application file for complete search history.

(56) References Cited

U.S. PATENT DOCUMENTS 5,724,272 A 3/1998 Mitchell et al.
5,954,829 A * 9/1999 McLain et al. ............. 714/712
6,449,744 B1 * 9/2002 Hansen ....................... 714/738

OTHER PUBLICATIONS

National Instruments "The Measurement and Automation Catalog 2000" pp. 678-707, © 1999.
Using the VISA Interactive Control (VISAIC), 4 pgs. 1998.
Using the VISA Interactive Control to Communicate with VXI/VME Devices, 4 pgs. 2001.
NI-488.2 User Manual for Windows, Jun. 1999 Edition, pp. 6-1 through 6-11.
GPIB Troubleshooting Resources, Introduction to the Interactive Control (IBIC), 2003, pp. 1-6.

* cited by examiner

*Primary Examiner*—Cao (Kevin) Nguyen
(74) *Attorney, Agent, or Firm*—Meyertons Hood Kivlin Kowert & Goetzel, P.C.; Jeffrey C. Hood

(57) ABSTRACT

An instrument I/O assistant and the algorithms that may be used to manage instrument responses and that may provide an instrument-centric approach to message-based instrument I/O. The instrument I/O assistant may assist the user in parsing instrument responses by offering an environment to interact with an instrument response without forcing the user to write parsing code. Embodiments may be integrated into instrumentation control programs to make instrument I/O as transparent as possible. The instrument I/O assistant may provide code generation so that the parsing of an instrument response performed in the instrument I/O assistant can be reused. The saved code for one query and response may be referred to as a query block. Two or more query blocks may be saved into a task. A task is a series of executable query blocks. The task may be executed, or alternatively code may be generated to execute the task.

61 Claims, 14 Drawing Sheets

Fig. 3 - I/O scriptor user interface

Fig. 4 - Hex Byte Array - Hex mode

Fig. 5 - Hovering

Fig. 6 - Hex Byte Array and String

Fig. 7 - ASCII String - ASCII mode

Fig. 8 - ASCII Number Array - ASCII mode

METHOD AND APPARATUS FOR CONTROLLING AN INSTRUMENTATION SYSTEM

PRIORITY CLAIM

This application claims benefit of priority of U.S. provisional application Ser. No. 60/312,257 titled "Method and Apparatus for Controlling an Instrumentation System" filed Aug. 14, 2001, whose inventors are David W Fuller III, Christopher G. Cifra and Thomas V. Connell Jr.

FIELD OF THE INVENTION

The present invention relates to I/O control software for instrumentation systems, and more particularly to a system and method for querying message-based instruments, parsing the responses, and generating code that encapsulates the connection/communication with the instrument and the parsing of the response.

DESCRIPTION OF THE RELATED ART

An instrument is a device that collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, temperature sensors, machine vision systems (e.g. cameras), microphones, etc., and the types of information which might be collected by respective instruments include voltage, resistance, distance, velocity, pressure, frequency of oscillation, environmental information such as humidity and temperature, video and image data, and audio data among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone. An incremental improvement in the manner in which a user interfaced with various instruments was made with the introduction of centralized control panels. In these improved systems, individual instruments are wired to a control panel, and the individual knobs, indicators or switches of each front panel are either preset or selected for presentation on a common front panel.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general-purpose personal computers and workstations combined with instrumentation software and hardware to build a complete instrumentation system. In an exemplary virtual instrumentation system, a software program executing on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into various types, including, but not limited to, IEEE 488-controlled instruments (GPIB instruments), VXI bus instruments, PXI bus instruments, plug-in data acquisition (DAQ) boards, and serial instruments including RS-232, USB and IEEE-1394 instruments. Background on these various hardware interface options is deemed appropriate.

The GPIB (General-Purpose Interface Bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME eXtension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message-based instruments and register-based instruments. A message-based instrument is an instrument that is controlled by a string of ASCII characters, whereas a register-based instrument is controlled by writing a bit stream directly to registers in the instrument hardware.

The PXI (PCI extension for Instrumentation) bus is a platform for measurement systems promulgated by National Instruments Corporation. The PXI bus is based on the computer PCI bus and includes various additional signal lines for instrumentation.

An instrumentation system using a data acquisition interface method typically includes transducers that sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. The data acquisition card may then perform A/D conversion on the received analog signals to generate corresponding digital signals. These digital signals may then be analyzed or processed, either by the DAQ card or by the computer system.

A computer may also control an instrumentation system through a serial bus such as the computer's serial or RS-232 port, USB or IEEE 1394.

Due to the wide variety of possible testing situations and environments, and also the wide array of instruments available, it is often necessary for a user to develop a program to control respective instruments in the desired instrumentation system. Therefore, implementation of such systems frequently requires the involvement of a programmer to develop software for acquisition, analysis and presentation of instrumentation data.

The software architecture for a virtual instrumentation system comprises several components. The top level of the software architecture typically comprises an applications program used for high-level control of the virtual instrument. Examples of program development environments for high-level applications programs for instrumentation control are LabVIEW and LabWindows/CVI from National Instruments Corp and HP VEE from Agilent, among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows/CVI applications' software each include instrument libraries comprising drivers for hundreds or more of GPIB, VXI, PXI and serial instruments from numerous manufacturers. The instrument drivers are designed to reduce a user's application development time by providing intuitive high level functions that relieve the user of complex low level instrument programming.

The software level referred to as driver level software is lower than the instrument driver level in the software architecture hierarchy. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, NI-VXI and NI-VISA driver level software offered by National Instruments, Inc. Another example of driver level software is the Standard Instrument Control Library (SICL) offered by Hewlett-Packard.

There may be some instruments for which drivers are not provided. Also, there may be users of an instrumentation system who do not want the complications that are inherent with learning to use a driver or that do not have access to a driver. In this case, the user may desire to simply send a command to the instrument and read a response. The user may not require performance or special features, but simply desires to connect to an instrument and perform I/O. Currently GPIB, Serial, or VISA calls may be used to send a command, read the response, and the user is required to use the Application Development Environment (ADE) to create a program to parse the response. Thus, in many cases the user may be forced to write mini instrument drivers with the desired subset instrument functionality. Both instrument connection/communication and instrument response parsing are difficult and time-consuming tasks.

Therefore, a system and method is desired which provides consistent software architecture for control of instrumentations systems. A method and apparatus is also desired which provides a more consistent mechanism for developing instrument drivers and instrumentation control software. A system and method are also desired which encapsulates the connection/communication with the instrument and the parsing of the instrument response.

SUMMARY OF THE INVENTION

The present invention comprises various embodiments of a system and method for querying message-based instruments, automatically and/or graphically parsing the responses, and generating code that encapsulates the connection/communication with the instrument and the parsing of the response. Embodiments of the invention may be implemented in a measurement system comprising a computer system coupled to one or more message-based instruments.

In an embodiment, the computer system may automatically detect the one or more message-based instruments that are connected to the computer system. In other words, the computer system may automatically scan for message-based instruments coupled to the system. A user interface (UI) may be provided that allows the user to initiate a scan for message-based instruments. The user may scroll through and select an instrument from a list of detected instruments, or may otherwise specify a particular instrument to be communicated with.

The user may then enter a command (e.g. query) to send to the selected instrument. In one embodiment, the user may enter the command by typing it in to a query field. In one embodiment, if the instrument type can be determined (e.g. DMM, scope, arbitrary waveform (arb)/function generator, counter, etc.), or alternatively if the user specifies the instrument type, then syntax completion and suggestions, for example according to the SCPI standard, may be provided to the user. In one embodiment, instrument vendors and/or third parties may provide a file for a specific instrument that describes the command syntax of the instrument. This file may then be used in providing syntax information to the user. If such a file exists, then the standard SCPI syntax completion may be replaced with syntax completion based on the custom file. After entering the command, the user may select a user interface item to cause the command to be sent the instrument.

A response may be received from the instrument after the command is sent. The received response may then be parsed.

In one embodiment, the response may be automatically pre-parsed. Using parsing, for example, instead of a string of ASCII characters and binary numbers, the user will see the actual number(s) corresponding to a voltage reading. If the pre-parsing does not interpret the instrument response correctly, then the user may interactively vary how the response string is parsed. Characteristics associated with instrument command strings and response strings that the user may set or change in order to define the desired command/response include, but are not limited to, data type, binary/text format, endianness, tokens/sequences, scaling, output data (waveforms, etc.), and headers on/off.

In one embodiment, the user may position and/or size an icon, e.g. a transparently colored icon, e.g. a lens, that spans over a portion of the response data and highlights it. The data underneath the lens icon is set apart as a "token". In one embodiment, the appearance (e.g. color and/or texture) of the transparent lens icon may be used to specify the data type of the token. As the user scrolls through to parse the rest of the data in the response, the data may maintain its highlighted appearance (e.g. color) to indicate that it is "tokenized". For every token in the data response, the user may be able to specify the data type to interpret the token, a count to specify a sequence or array of values, a delimiter for an array of values, the data type that may be used to output the data, scaling parameters for that token, and a name for the output parameter, among other characteristics.

The results of the graphical token specification as described above may be used to automatically create text-based code (e.g. C, C++, .NET) and/or graphical code (e.g. a LabVIEW graphical code object that can be included in a virtual instrument) that may be used to programmatically perform the same functions as were performed interactively by the user. These functions may include communicating with an identified instrument, sending command(s) to the identified instrument, reading back responses from the instrument, and parsing the received response (for display or for other uses), among others. Code may also be generated to call and execute the saved configuration from a graphical language and/or a text-based language. The saved code for one query and response may be referred to as a query block. The user may perform the above functions two or more times to generate a series of two or more query blocks which may be combined into a task. The task may then be executed, or alternatively code may be generated to execute the task.

In one embodiment, a plurality of query blocks may be generated in response to user input. Each query block may be executable within an instrumentation system to connect with a message-based instrument, send a query message to the message-based instrument, receive a response to the query message from the message-based instrument, parse the response, and output results of parsing the response. The user may graphically sequence the plurality of query blocks in a desired order of execution, and store the sequenced plurality of query blocks in a task.

In one embodiment, a task object may be generated in response to user input. The user may then graphically add the task object to an instrument control application program. The user may invoke a user interface for graphically editing the task object. The user may then graphically generate one or more query blocks using the user interface. Each query block may be executable within an instrumentation system to connect with a message-based instrument, send a query message to the message-based instrument, receive a response to the query message from the message-based instrument, parse the response, and output results of said parsing the response. The user may then graphically add the one or more query blocks to the task object.

BRIEF DESCRIPTION OF THE DRAWINGS

A better understanding of the present invention can be obtained when the following detailed description of the preferred embodiment is considered in conjunction with the following drawings, in which.

Figure 1A:
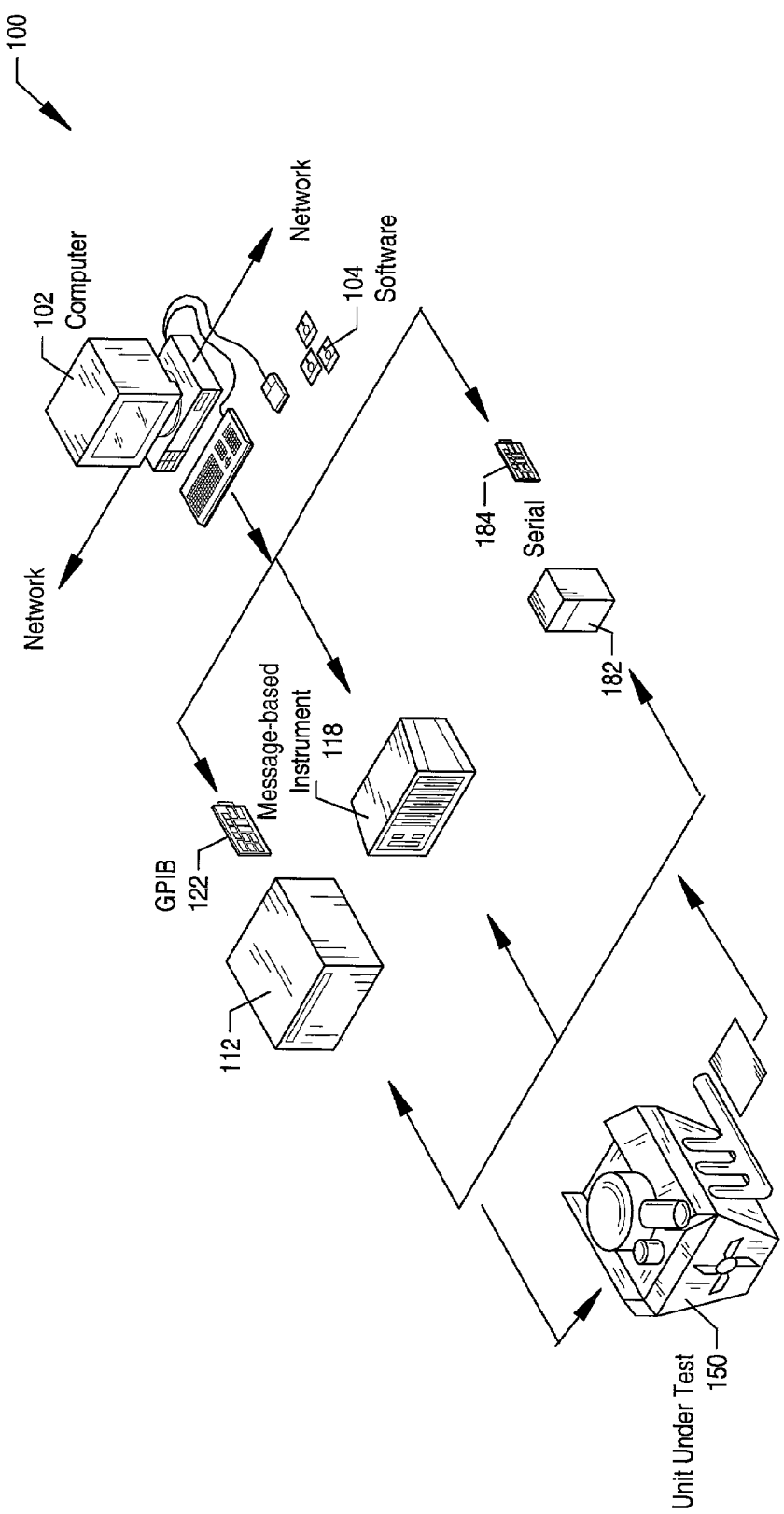
FIGS. 1A, 1B and 2 illustrate representative instrumentation control systems of the present invention including various I/O interface options.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE PREFERRED EMBODIMENT

The preferred embodiment of the invention is adapted for instrumentation control systems. However, it is noted that the method and apparatus of the present invention discloses a software architecture model that has numerous other applications in any of a number of fields. The following disclosure describes the preferred embodiment of the invention in an instrumentation control system application.

Figure 1B:
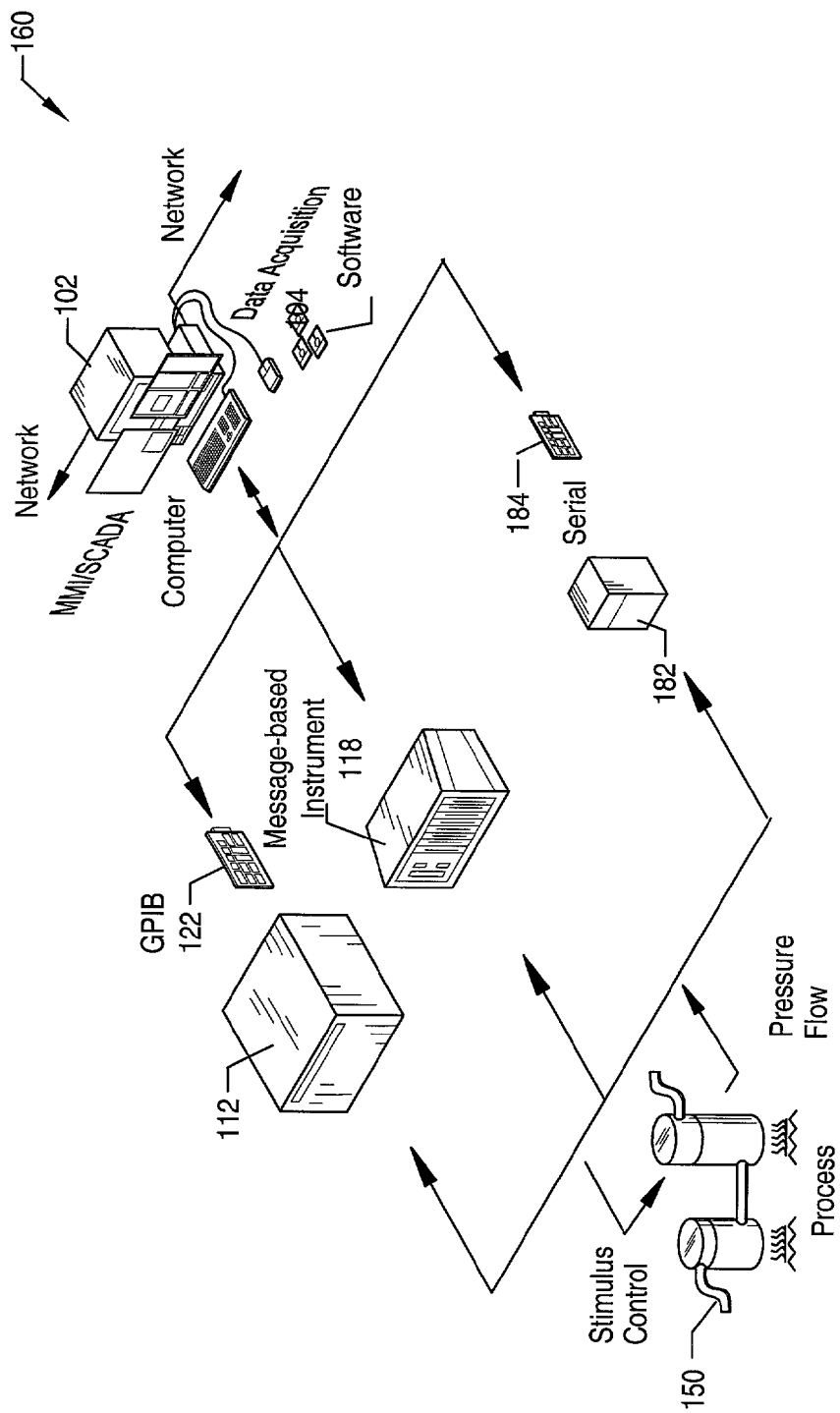

FIGS. 1A and 1B—Instrumentation and Industrial Automation Systems

The following describes embodiments of the present invention involved with performing test and/or measurement functions and/or controlling and/or modeling instrumentation or industrial automation hardware. The system and method of the present invention may assist the user in parsing data such as instrument responses without forcing the user to write parsing code. The data may be of any of a variety of types of data including, but not limited to, ASCII data and binary data.

It is noted that the present invention may be used for a plethora of applications and data and is not limited to instrumentation or industrial automation applications and data. In other words, the following description is exemplary only, and the present invention may be used in any of various types of systems to parse any of various types of data. Thus, the system and method of the present invention is operable to be used in any of various types of applications, including the control of other types of devices such as multimedia devices, video devices, audio devices, telephony devices, Internet devices, etc.

FIG. 1A illustrates an exemplary instrumentation control system 100 which may implement embodiments of the invention. The system 100 comprises a host computer 102 which connects to one or more instruments. The host computer 102 may comprise a CPU, a display screen, memory, and one or more input devices such as a mouse or keyboard as shown. The computer 102 may operate with the one or more instruments to analyze, measure or control a unit under test (UUT) or process 150.

The one or more instruments may include message-based instruments such as a GPIB instrument 112 and associated GPIB interface card 122, a serial instrument 182 and associated serial interface card 184, and/or one or more other message-based instruments 118 and associated instrument cards (not shown). The host computer 102 may optionally also connect to other types of devices such as a data acquisition board and associated signal conditioning circuitry (not shown), a VXI instrument (not shown), a PXI instrument (not shown), a video device or camera and associated image acquisition (or machine vision) card (not shown), a motion control device and associated motion control interface card (not shown), and/or one or more computer based instrument cards (not shown), a fieldbus device and associated fieldbus interface card (not shown), a PLC (Programmable Logic Controller) (not shown), or a distributed data acquisition system, such as the Fieldpoint system available from National Instruments, among other types of devices.

The GPIB instrument 112 may be coupled to the computer 102 via the GPIB interface card 122 provided by the computer 102. The GPIB card 122, serial interface card 184, and/or other interface cards (if any) are typically plugged in to an I/O slot in the computer 102, such as a PCI bus slot, a PC Card slot, or an ISA, EISA or MicroChannel bus slot provided by the computer 102. However, the cards 122 and 184 are shown external to computer 102 for illustrative purposes. These devices may also be connected to the computer 102 through a serial bus or through other means.

A VXI chassis or instrument may be coupled to the computer 102 via a VXI bus, MXI bus, or other serial or parallel bus provided by the computer 102. The computer 102 may include VXI interface logic, such as a VXI, MXI (not shown) or GPIB interface card 122, which interfaces to the VXI chassis. A PXI chassis or instrument may be coupled to the computer 102 through the computer's PCI bus.

A serial instrument 182, and associated serial interface card 184, may also be coupled to the computer 102 through a serial port, such as an RS-232 port, USB (Universal Serial bus) or IEEE 1394 or 1394.2 buses, provided by the computer 102.

In typical instrumentation control systems an instrument of each interface type may not be present, and in fact many systems may only have one or more instruments of a single interface type, such as only GPIB instruments.

The instruments may be coupled to a unit under test (UUT) or process 150, or may be coupled to receive field signals, typically generated by transducers or sensors. The system 100 may be used in a data acquisition and control application, in a test and measurement application, an image processing or machine vision application, a process control application, a man-machine interface application, a simulation application, or a hardware-in-the-loop validation application.

FIG. 1B illustrates an exemplary industrial automation system 160 that may implement embodiments of the invention. The industrial automation system 160 is similar to the instrumentation or test and measurement system 100 shown in FIG. 1A. Elements which are similar or identical to elements in FIG. 1A have the same reference numerals for convenience. The system 160 may comprise a computer 102 that connects to one or more devices or instruments. The computer 102 may comprise a CPU, a display screen, memory, and one or more input devices such as a mouse or keyboard as shown. The computer 102 may operate with the one or more devices to a process or device 150 to perform an automation function, such as MMI (Man Machine Interface), SCADA (Supervisory Control and Data Acquisition), portable or distributed data acquisition, process control, advanced analysis, or other control.

The one or more instruments may include message-based instruments such as a GPIB instrument 112 and associated GPIB interface card 122, a serial instrument 182 and associated serial interface card 184, and/or one or more message-based instruments 118 and associated instrument cards (not shown). The host computer 102 may optionally also connect to other types of devices such as a data acquisition board and associated signal conditioning circuitry (not shown), a VXI instrument (not shown), a PXI instrument (not shown), a video device or camera and associated image acquisition (or machine vision) card (not shown), a motion control device and associated motion control interface card (not shown), and/or one or more computer based instrument cards (not shown), a fieldbus device and associated fieldbus interface card (not shown), a PLC (Programmable Logic Controller) (not shown), or a distributed data acquisition system, such as the Fieldpoint system available from National Instruments, among other types of devices.

The GPIB instrument 112 may be coupled to the computer 102 via the GPIB interface card 122 provided by the computer 102. The serial instrument 182 may be coupled to the computer 102 through a serial interface card 184, or through a serial port, such as an RS-232 port, provided by the computer 102. A PLC may couple to the computer 102 through a serial port, Ethernet port, or a proprietary interface. A fieldbus interface card may be comprised in the computer 102 and may interface through a fieldbus network to one or more fieldbus devices. The GPIB card 122, serial interface card 184, and/or other interface cards (if any) are typically plugged in to an I/O slot in the computer 102, such as a PCI bus slot or a PC Card slot provided by the computer 102. In typical industrial automation systems a device will not be present of each interface type, and in fact many systems may only have one or more devices of a single interface type, such as only serial devices. The devices may be coupled to the device or process 150.

As used herein, the term "instrument" is intended to include any of the devices that are adapted to be connected to a computer system as shown in FIGS. 1A and 1B, traditional "stand-alone" instruments, as well as other types of measurement and control devices. As used herein, the term "message-based instrument" includes instruments or measurement and/or automation devices that are controlled by messages, e.g. by strings of ASCII and/or hexadecimal characters. Exemplary message-based instruments are shown in FIGS. 1A and 1B. The term "measurement function" may include any type of data acquisition, measurement or control function, such as that implemented by the instruments shown in FIGS. 1A and 1B. For example, the term "measurement function" includes acquisition and/or processing of an image. As described below, a graphical program may be created that implements a measurement function. For example, the graphical program may be used to acquire a signal and perform the measurement function on the acquired signal.

In the embodiments of FIGS. 1A and 1B above, one or more of the various instruments may couple to the computer 102 over a network, such as the Internet. In one embodiment, the user operates to select a target instrument or device from a plurality of possible target devices for programming or configuration. Thus the user may create a program on a computer and use the program in conjunction with a target device or instrument that is remotely located from the computer and coupled to the computer through a network.

Software programs which perform data acquisition, analysis and/or presentation, e.g., for measurement, instrumentation control, industrial automation, or simulation, such as in the applications shown in FIGS. 1A and 1B, may be referred to as virtual instruments.

Although the preferred embodiment of the invention is described with respect to measurement applications, including data acquisition/generation, analysis, and/or display, and for controlling or modeling instrumentation or industrial automation hardware, as noted above the present invention can be used for a plethora of applications and is not limited to measurement, instrumentation or industrial automation applications. In other words, FIGS. 1A and 1B are exemplary only, and the present invention may be used in any of various types of systems. Thus, the system and method is operable for querying message-based devices, parsing the responses, and generating code that encapsulates the connection/communication with the instrument and the parsing of the response for any of various types of applications.

Figure 2:
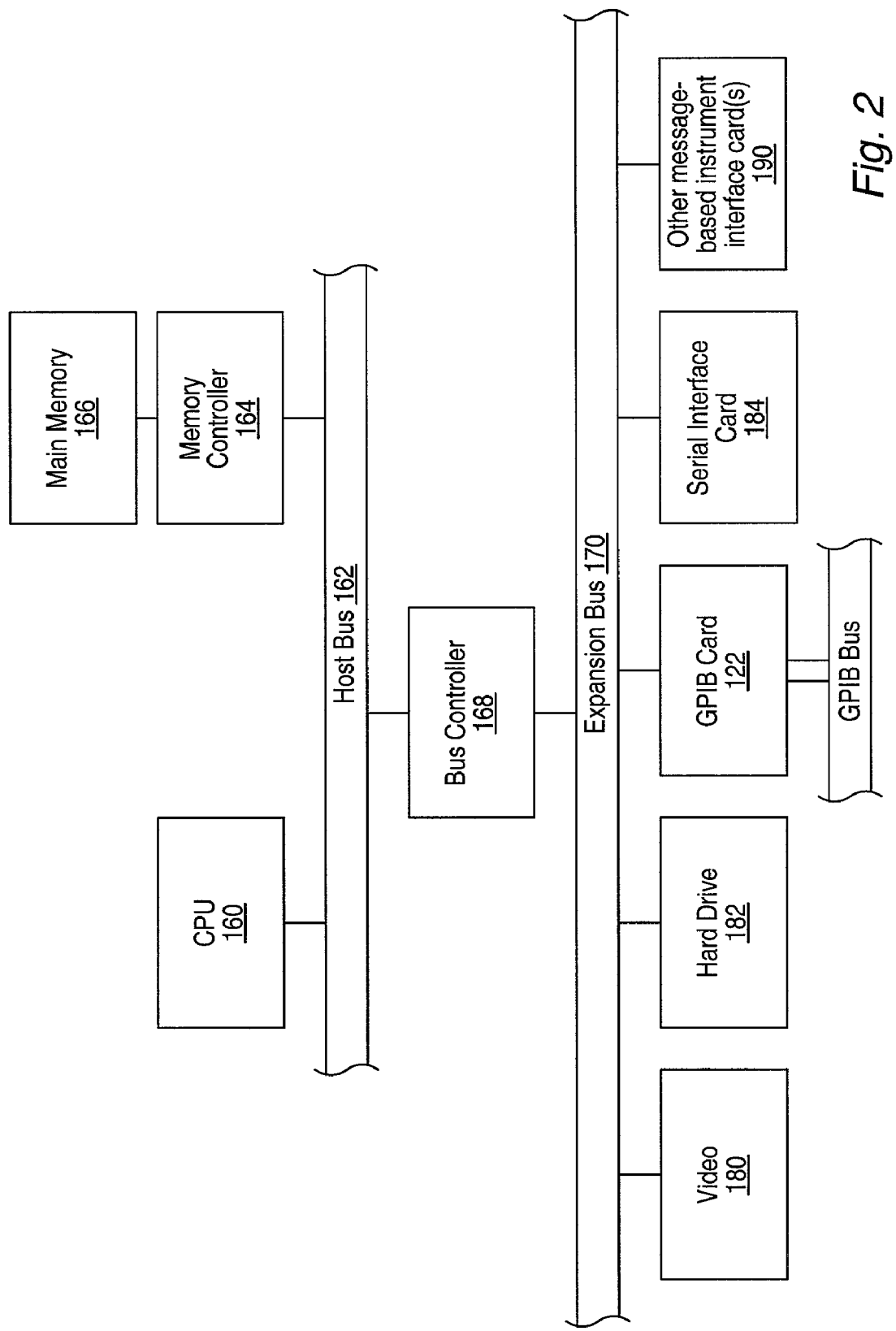

FIG. 2—Computer System Block Diagram

FIG. 2 is a block diagram representing one embodiment of a computer system 102 shown in FIGS. 1A or 1B. It is noted that any type of computer system configuration or architecture can be used as desired, and FIG. 2 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store the graphical program operable to receive and respond to programmatic events. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a serial interface card 184 which provides a serial interface to a serial instrument, a GPIB interface card 122 which provides a GPIB bus interface to a GPIB instrument, and/or one or more other message-based instrument interface cards 190. The computer may further comprise a video display subsystem 180 and/or hard drive 182 coupled to the expansion bus 170.

As described above, one or more instruments may also be connected to the computer through instrument interface cards. In various embodiments, one or more instruments or devices may be connected to the computer through means other than an expansion slot, e.g., the instrument or device may be connected via an IEEE 1394 bus, USB, or other type of port.

Instrument I/O Assistant

Embodiments of an instrument I/O assistant and the algorithms that may be used to manage instrument responses are described. An instrument I/O assistant may provide an instrument-centric approach to message-based instrument I/O. The instrument I/O assistant may assist the user in parsing one or more instrument responses by offering an environment that enables a user to interact with an instrument response without forcing the user to write parsing code. A method may also be provided to make tasks created using the instrument I/O assistant persistent so that they may be reused and distributed, if desired.

Embodiments of the instrument I/O assistant may be integrated into one or more high-level application programs for instrumentation control (such as LabVIEW and LabWindows CVI from National Instruments Corp., among others) to make instrument I/O as transparent as possible. The instrument I/O assistant may also provide code generation so that the task created in instrument I/O assistant can be reused in one or more instrument control application programs.

Embodiments of the instrument I/O assistant may provide mechanisms to perform several functions, including, but not limited to:

a mechanism for identifying one or more instruments for communication;

a mechanism for entering and sending command(s) to an identified instrument;

a mechanism for reading back responses from the instrument, parsing a received response and displaying the parsed response; and a mechanism for creating and saving program code (e.g. text-based or graphical (e.g. LabVIEW) code) that may later be used to communicate with the identified instrument, send command(s) to the identified instrument, read back responses from the instrument, and parse the received response (for display or for other uses).

The instrument I/O assistant may provide a user interface (UI) to perform each of these functions. In one embodiment, the user interface may be a Graphical User Interface (GUI). In one embodiment, the instrument I/O assistant may provide a graphical user interface window through which each of these functions may be performed under user control. Several examples of such a user interface (U/I) 200 are illustrated in FIGS. 3 through 8, described below.

The saved code for one query and response may be referred to as a query block. A user may use the instrument I/O assistant to perform the above functions two or more times to generate a series of two or more query blocks which may be saved into a task. A task is a series of sequentially executable query blocks. The task may later be executed, or alternatively code may be generated to execute the task.

As an example of generating and using a task, in a graphical instrument control application program, a task object may be added to a program (e.g. a virtual instrument program) being created or edited. From the task object, an instrument I/O assistant user interface (UI) may be invoked. The instrument I/O assistant UI may be used to create and add one or more query blocks to the task. Input(s) and output(s) of the task object may also be linked with one or more other objects in the program. When the program is later executed, the task may execute to send the series of one or more commands (queries) to the identified instrument, read the instrument response(s), and parse the instrument responses in accordance with the parsing information saved in the query blocks. The parsed instrument responses may then be displayed and/or input to other objects in the program.

Figure 3:
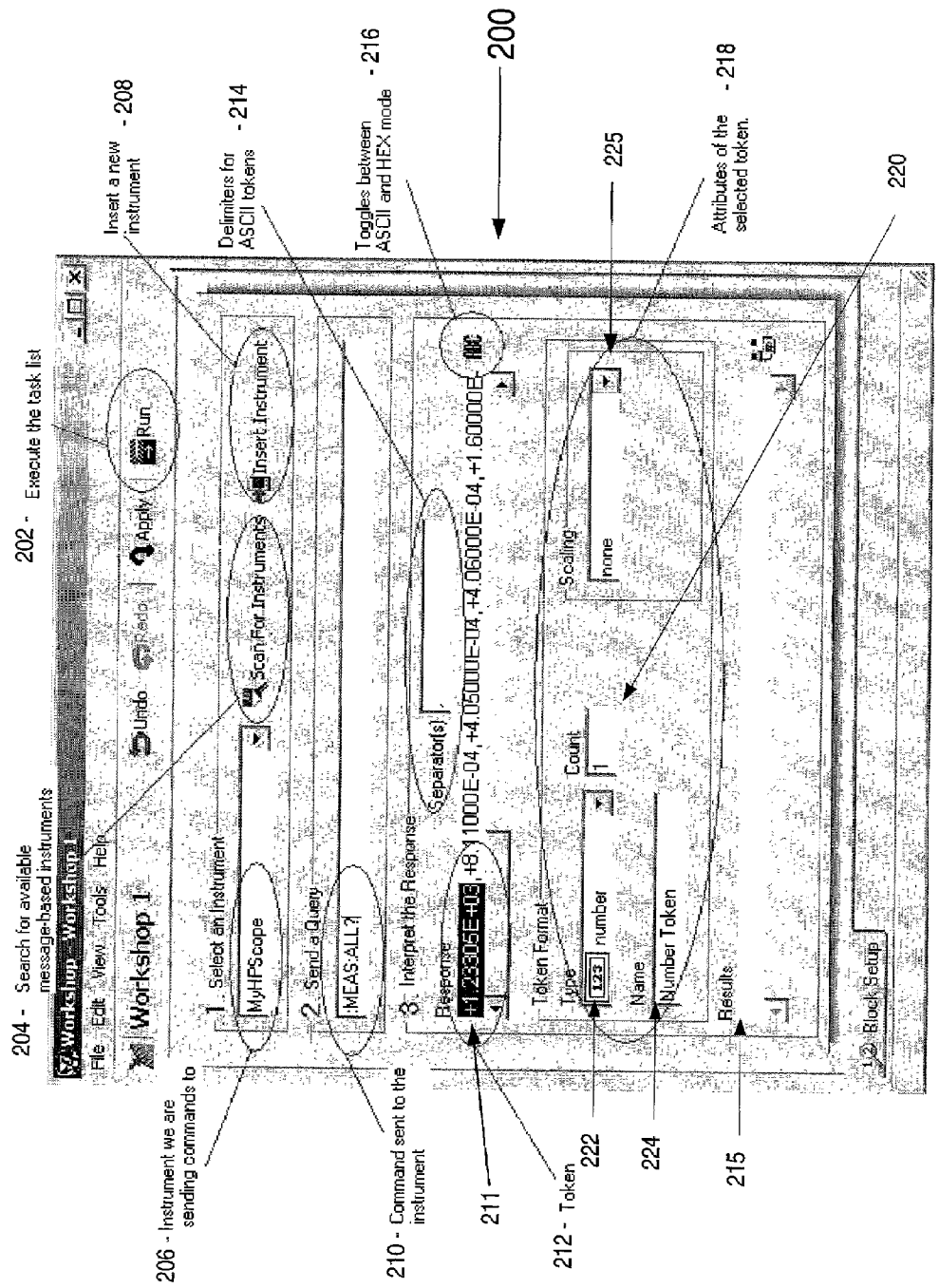
FIG. 3 illustrates an exemplary instrument I/O assistant User Interface (UI) according to one embodiment in ASCII mode.

As mentioned above, the instrument I/O assistant may provide a graphical user interface window through which the various functions of the instrument I/O assistant may be performed under user control. In one embodiment, there may be one main view or user interface (UI). One embodiment of such a UI is illustrated in FIG. 3. From this UI the user may select the instrument with which to communicate. The collection of controls of the instrument I/O assistant UI 200 that allow the user to manipulate how an instrument response is parsed may be referred to as the instrument response parser control (IRPC). In one embodiment, the IRPC varies depending on whether the response is ASCII or HEX format. The user may toggle this feature. This UL may include special highlighting and hover features so that the user can interact and modify the manner in which the control parses the data. The IRPC may have one or more user interface items that may be manipulated by the user to parse the response. The user interacts with the IRPC to manually define the interpretation of the data. In one embodiment, upon receiving a response, the instrument I/O assistant may perform parsing functions on the response automatically and display the results of the parsing to the user via the IRPC. The user may then accept the automatic parsing or may choose to override one or more functions of the parsing.

The instrument I/O assistant GUI may include several sections that allow the user to select an instrument, enter a command to query the instrument, and script the result or response from the instrument. The data in the response string may be shown as binary (e.g. hexadecimal format) or ASCII format; this option may be toggled by the user by selecting a user interface item. In one embodiment, the user may not modify the response string. The user may scroll through the response string to highlight the data the user is interested in. The highlighted token may then read as a particular data type, for example a 2-byte integer. If the user selected a 1-byte integer as the data type, then the highlighted region may shrink and only highlight one byte of data. The byte order may be toggled; for example, a 2-byte integer represented by the HEX values "d0 00" may be toggled to interpret the value as the "d0" byte being most significant or the "00" byte being most significant. The user may also specify a sequence of values to be interpreted the same way (for example, an array). For example, the user may query 4000 data points, so the user may tokenize the first 2-byte value and cause the parser to read the next consecutive 3999 2-byte values in the same manner as the first 2-byte value is read. If the response is in ASCII format and there is a sequence of strings, then the user may specify the delimiter for the sequence. The value format controls may be used to determine how the value is output in the instrument control application programs (e.g. LabVIEW). For example, the user may wish to output the above-mentioned array of 4000 2-byte values as 4000 double values. The user may also optionally name the output variable. The user may also use the instrument I/O assistant GUI to specify a scaling function if the values need to be scaled.

On occasion, the user may desire a certain value output and be less concerned with the formatting of the response string. In one embodiment, the instrument I/O assistant allows the user to choose to work from the value format area before dealing with the response format area. Thus, the instrument I/O assistant does not constrain the user to following a set series of steps.

In one embodiment, the instrument I/O assistant GUI may also include an error return control that may be used to indicate an error or warning (if any) returned from the instrument due to the executed block. This error window may automatically appear in the case of an error, or optionally the user may bring it up by selecting it from a menu or through another user interface item. In one embodiment, the instrument I/O assistant may include bus and API call monitoring tools that operate similarly to the error return control.

FIG. 3—Exemplary I/O Scriptor User Interface

FIG. 3 illustrates an exemplary instrument I/O assistant User Interface (UI) 200 according to one embodiment. The instrument I/O assistant UI 200 may include one or more tabs or windows for performing the various functions of the instrument I/O assistant. Using the UI 200, one or more query blocks may be created and saved into a task or task list (for example, by using an Apply UI item to add a query block and a Redo UI item to repeat a query block). The user may execute the task list by selecting the "Run" user interface item 202 to view the results of executing the one or more query blocks in the current task.

Identifying One or More Instruments

As illustrated in FIG. 3, the instrument I/O assistant UI 200 may provide user interface elements for discovering, identifying, specifying and entering message-based instruments. The instrument I/O assistant may automatically scan for message-based instruments coupled to the system 102 within which the instrument I/O assistant is executing. The instrument I/O assistant UI 200 may provide a control 204 that allows the user to initiate a scan for message-based instruments. In one embodiment, the instrument I/O assistant UI 200 may provide a control 208 to insert a new instrument. The user may select an instrument to which communication is desired using instrument display list control 206. In one embodiment, the user may scroll through and select an instrument from a list of detected instruments, or may otherwise specify a particular instrument to be communicated with, for example by entering a VISA resource string.

In one embodiment, the instrument I/O assistant may utilize GPIB and/or VISA MAX (Measurement and Automation eXplorer) providers in order to locate GPIB instruments and find serial ports. In one embodiment, the instrument I/O assistant may configure the serial ports for the user by trying different permutations of serial settings such as bandwidth, baud rate, parity, etc., and sending out *IDN? queries until something valid is returned. After scanning for GPIB instruments, the instrument I/P assistant may run a VISA resource expert and scan for all VISA message-based instruments.

The instrument I/O assistant UI 200 may display the list of detected instruments in instrument display list 206. The user may specify the target instrument for the command through the instrument display list 206. In one embodiment, the instrument information may be gathered by enumerating a database (e.g. an MXS database). The user may be provided with the option to re-search for available instruments, for example by running an expert such as the GPIB and VISA resource experts. When the instrument I/O assistant is invoked, the list of instruments located in the database may be displayed in instrument display list 206. If the instrument desired is not in the list, then the user may invoke the Scan for Instruments item 204. The experts (e.g. GPIB and VISA resource experts) may then populate the list with the newly found instruments. In one embodiment, the user may manually add an instrument using an optional "Insert Instrument" interface item 208. In one embodiment, as an alternative to selecting a detected instrument from a list, the user may be given the option of typing in a VISA resource string to specify an instrument.

Figure 14:
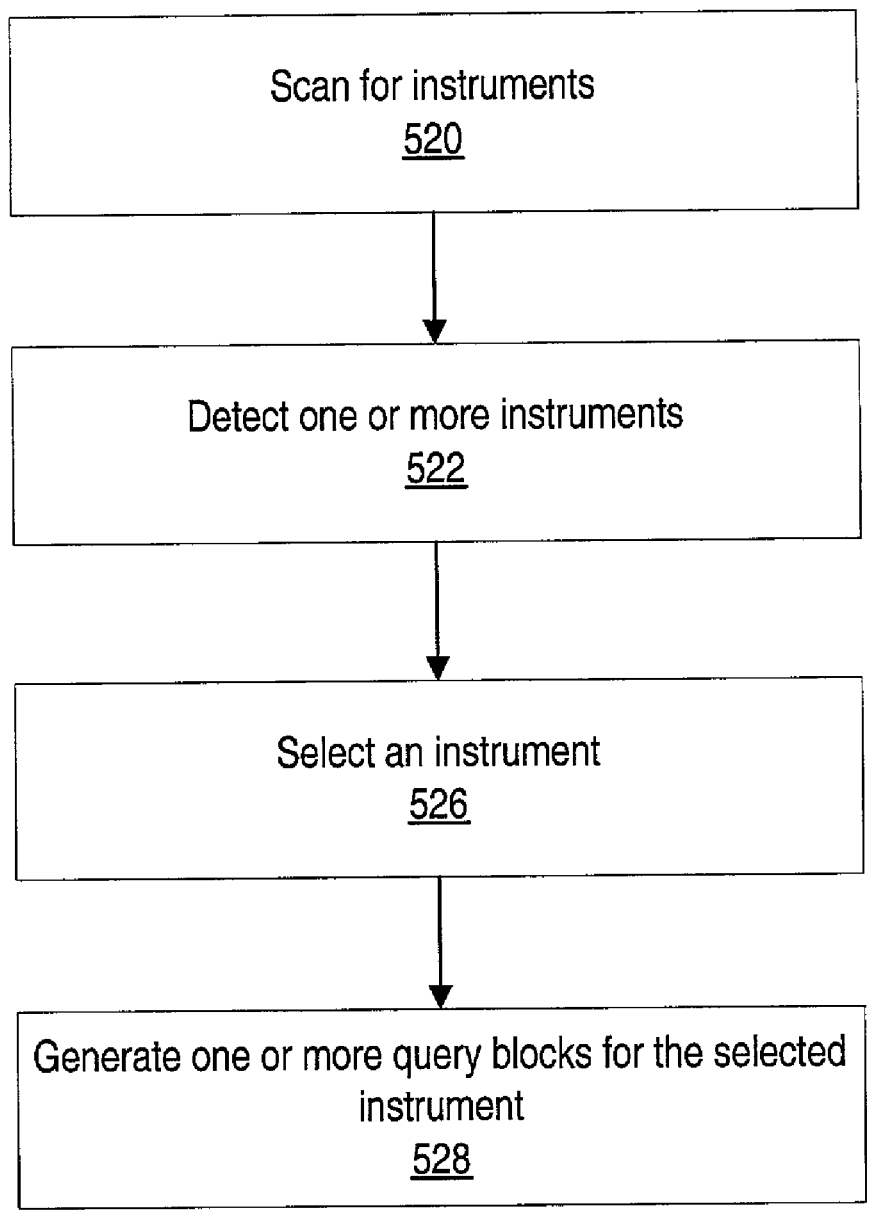
FIG. 14 is a flowchart illustrating a method of scanning for instruments according to one embodiment.

FIG. 14 is a flowchart illustrating a method of scanning for instruments according to one embodiment. As indicated at 520, the method may first scan for message-based instruments coupled to the instrumentation system. Scanning may detect at least a subset of the message-based instruments coupled to the instrumentation system as indicated at 522. The user may select one of the detected message-based instruments as indicated at 526. One or more query blocks for the selected instrument may then be generated in response to user input as indicated at 528. Each query block may be executable within the instrumentation system to connect with the selected message-based instrument, send a query message to the message-based instrument, receive a response to the query message from the message-based instrument, parse the response, and output results of parsing the response.

Entering Instrument Commands

As illustrated in FIG. 3, in an exemplary instrument I/O assistant UI 200, a user may enter commands by typing them in to a query field 210. After entering the command, the user may select a user interface item to cause the command to be sent the instrument. In one embodiment, if the instrument I/O assistant may determine the instrument type (e.g. DMM, scope, arbitrary waveform (arb)/function generator, counter, etc.), or alternatively if the user specifies the instrument type, then syntax completion and suggestions, for example according to the SCPI standard, may be provided to the user through the UI 200. In one embodiment, instrument vendors and/or third parties may provide a file for a specific instrument that describes the command syntax of the instrument. This file may then be used by the instrument I/O assistant in providing syntax information to the user. If such a file exists, then the standard SCPI syntax completion may be replaced with syntax completion based on the custom file.

In one embodiment, a history of entered commands may be retained. The command history may be used in any of several ways to assist the user. For example, when the user begins entering a command, the command history may be searched and one or more commands matching the command string so far entered may be displayed. The user may then select from the list of one or more commands. Alternatively, an interface to the command history may be provided through which the user may specify or copy a previously entered command.

Figure 4:
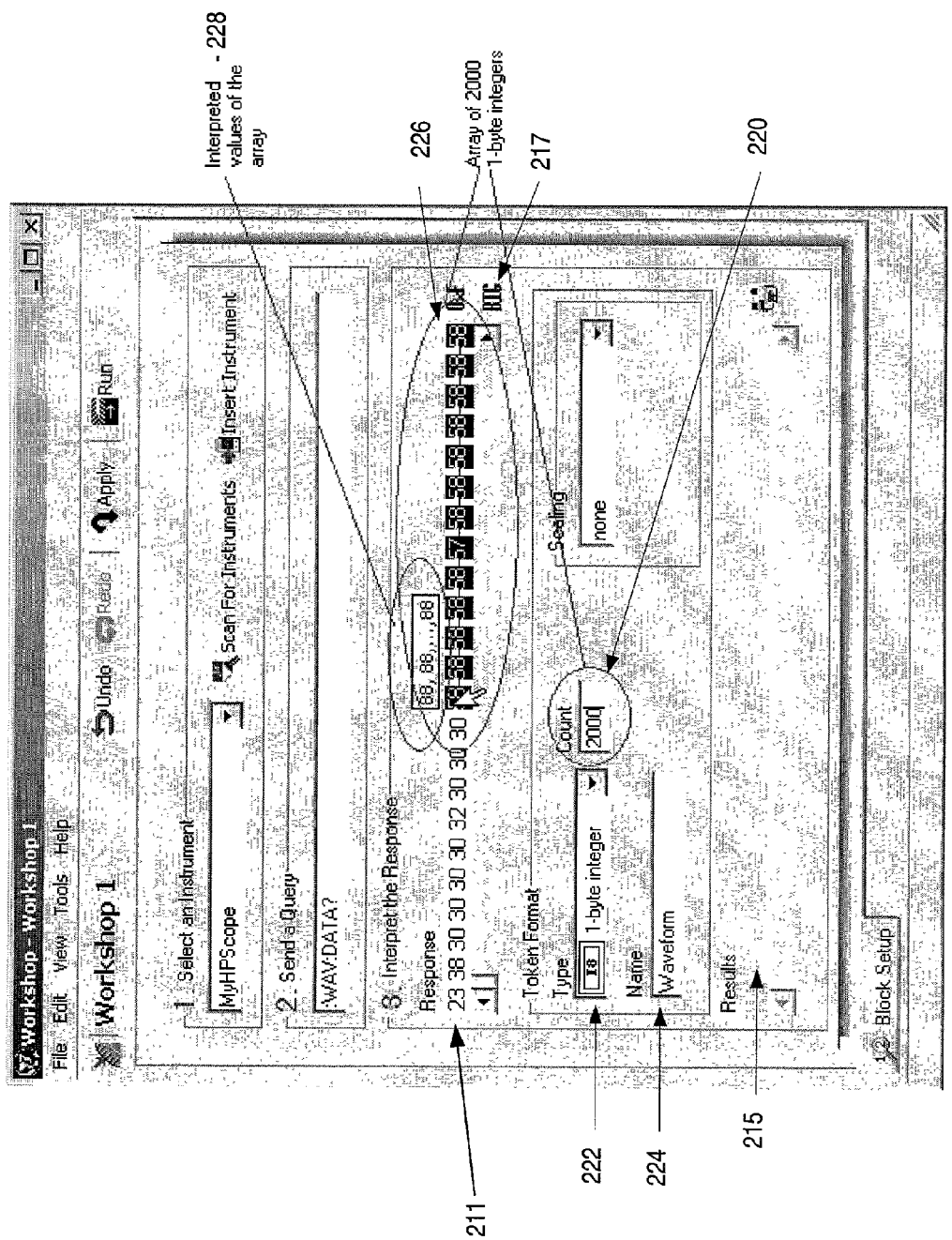
FIG. 4 illustrates an exemplary instrument I/O assistant User Interface (UI) according to one embodiment in HEX mode and shows a series of regions tokenized into a hex byte array.

The command entry mechanism may assist the user with entering data in a format common to traditional instrumentation. The command entry mechanism may provide a method for the user to choose from standard data types and to specify "endianness" of data. Big-endian and little-endian are terms that describe the order in which a sequence of bytes are stored in computer memory. Big-endian is an order in which the "big end" (most significant value in the sequence) is stored first (at the lowest storage address). Little-endian is an order in which the "little end" (least significant value in the sequence) is stored first. "Endianness" may apply only to data in hexadecimal (HEX) format. In one embodiment as illustrated in FIG. 4, an exemplary instrument I/O assistant UI 200 may provide a user interface item 217 to toggle between big-endian and little-endian when in HEX mode. The command entry mechanism may also provide a method or methods to import data from CSV files or through an interactive Waveform Editor.

In one embodiment, the instrument I/O assistant may use the VISA C-API (or alternatively NI-488.2 for GPIB only) to communicate with GPIB and Serial instruments, and the generated code (e.g. LabVIEW code) will use a VISA API (e.g. the VISA LabVIEW (LV) API). The instrument I/O assistant UI 200 may expose certain functionality specific to the bus the instrument selected is on (such as Wait for SRQ in GPIB). In one embodiment, these options may be only be exposed if necessary, for example, through an "Advanced Features" tab.

When the user types a command to send to a particular instrument, the instrument I/O assistant may save that command and its syntax so that, in another block or task when that instrument is selected again, the user can view a history of commands used for that particular instrument. In one embodiment, these command histories may be saved away and exported so that they are available for distribution (similar to instrument I/O assistant tasks). This may provide valid command options for the user without having to flip through an instrument manual, among other benefits.

Parsing Instrument Responses

Embodiments of the instrument I/O assistant may provide the user with several capabilities for parsing instrument responses, including, but not limited to, the ability to:

automatically determine if the instrument response is in HEX or ASCII format;

switch between ASCII and HEX format while retaining token specifications;

automatically "tokenize" ASCII responses for the user;

automatically parse responses and/or allow the user to graphically parse the responses save and reuse the user's instrument I/O assistant configuration; and programmatically execute the saved configuration.

The term "token" as used herein refers to a portion or region of the instrument response whose attributes (e.g., data type, position, size, byte ordering, arrayness, name, scaling, etc.) have been configured. FIG. 3 illustrates one example of a token 212 in response field 211 of the instrument I/O assistant UI 200. The configuration of the token may have been done either automatically or under user control, for example, by the user selecting or specifying attributes of the selected token in the attributes fields 218 as illustrated in FIG. 3. The term "tokenize" as used herein refers to the act of specifying tokens for an instrument response.

In one embodiment, instrument I/O assistant may "pre-parse" instrument responses. In one embodiment, instrument I/O assistant may use a library of data import functions to pre-parse instrument responses. Using parsing, for example, instead of a string of ASCII characters and binary numbers, the user will see the actual number(s) corresponding to a voltage reading. If the pre-parsing does not interpret the instrument response correctly, then the user may interactively vary how the response string is parsed. The parser may be able to automatically make intelligent assumptions about the data it is trying to interpret. If the parser makes incorrect or false assumptions, the user may be provided with a mechanism to correct those faulty assumptions. Characteristics associated with instrument command strings and response strings that the user may set or change in order to define the desired command/response include, but are not limited to:

Data type—What is the size and format of the data the user desires? For example, a 2-byte or 4-byte integer, a float or double?

Binary/text format—For example, does a response of "A" mean the letter A or is it a hex value?

Endianness—Byte ordering may be different for different instruments

Tokens/Sequences—If a series of values are in the response (i.e. an array), how are the values delimited and how is the end of the data sequence determined?

Scaling—Many instruments will return a value within a range, such as 0 and 4096, but in reality the value is scaled between two other values such as −5 and 5; The value 4096 is not very meaningful to a user that is measuring voltage readings between −5 and 5 volts. The user may be able to specify how the data is scaled so that scaled value is displayed and not the raw value.

Output data (waveforms, etc.)—how does the user desire to write complex data to an output instrument?

Headers On/Off—Some instruments may support headers (e.g. an instrument returning a voltage reading would return "VOLT 10.0" when headers are toggled on, and "10.0" when headers are toggled off.) If the parser assumes headers are off, but they are really on, then the parser may have problems parsing the data correctly. The user may be able to toggle this option if the parser is making a false assumption.

In one embodiment, the instrument I/O assistant may automatically determine some of these characteristics. For example, the instrument I/O assistant may query the instrument to determine if headers are turned on or off. However, since errors may occur during automatic detection of one or more of the characteristics, or the user may desire to override an automatically determined characteristic, the instrument I/O assistant may provide a mechanism for the user to manually set the characteristics.

The collection of controls of the instrument I/O assistant UI 200 that allows the user to manipulate how an instrument response is parsed may be referred to as the instrument response parser control (IRPC).

In one embodiment, the system may provide the user with the capabilities to graphically parse the instrument response. In one embodiment, the user may position an icon over a portion of the response data to select the portion of the response data. For example, the user may size a transparently colored "lens" icon that spans over a portion of the response data and highlights it. The data underneath the lens icon is set apart as a token. In one embodiment, the appearance (e.g. color and/or pattern) of the transparent lens icon may be used to specify the data type of the token as it is interpreted by the IRPC. As the user scrolls through to parse the rest of the data in the response, the data may maintain its highlighted color to indicate that it is tokenized. In addition to the token lens icon, the IRPC may include user interface items to toggle between binary (e.g. Hexadecimal) and ASCII data format, big-endian and little-endian byte ordering, and turning headers on/off, among others. In one embodiment, these toggles may apply to the entire instrument response, not individual values within the response; a response may include multiple values. For every token in the data response, the user may be able to specify the data type to interpret the token, a count to specify a sequence or array of values, a delimiter for an array of values, the data type that the instrument I/O assistant may use to output the data, scaling parameters for that token, and a name for the output parameter. The user may specify a sequence of values by "connecting" two values and specifying the terms of the sequence (i.e. how many values are in the sequence, how is it delimited, etc.). Thus, the instrument I/O assistant may assume the same data type and scaling settings for all values in that sequence. The IRPC may include a results box 215 that displays the output data that has been parsed. The results box 215 may show the interpreted value of the selected token. As the user scrolls through the instrument response, the results box may also scroll to align the response data with its corresponding parsed output data.

In one embodiment, the data may be displayed graphically. For example, the data may be displayed as an X-Y graph of the data over time, as a chart (e.g. bar chart), or by any graphical method suitable for displaying the data. In one embodiment, the user may toggle between two or more different graphical displays of the data. In this embodiment, if the data includes multiple elements (e.g. array data), the array data may be graphed, and if the data is a single element, a textual (ASCII character) representation of the value of that single element may be displayed. In another embodiment, the data may be displayed textually. This data may be highlighted to distinguish its output data type. In yet another embodiment, the data may be displayed both graphically and textually. In one embodiment, the user may toggle between graphical and textual display of the data.

The IRPC may be used as described for an instrument response from an instrument read or query. In one embodiment, a similar IRPC interface may be used to specify the data format of data that will be written to an instrument. This may be done, for example, by allowing the user to type a command into the control and to specify the type via the tokenization icon (e.g. a lens icon). The command string may then be edited using this information so that the value is written correctly. In one embodiment, a similar IRPC interface may be used to specify a waveform, for example to write the waveform to an ARB.

Embodiments of the instrument I/O assistant parser mechanism may have functionality including, but not limited to:

Data to be parsed may be either an ASCII string or binary data

Parser may auto-parse an input string if the input follows a known format

The parser may accept a list of "known format" templates

Parser may include a pre-parse method which returns the "best fit" parse string

Parser may parse an input sequence given a parse template

Parser may output a parsed sequence along with the data indices of the input stream, which match the tokens in the output sequence, and indices of the input template, which generated each output token.

The parse templates may be modifiable by an interactive parser. This means that the parse template may not have very many things in it that effect how the input sting is interpreted as a whole. For example, the user may be able to specify the endianness for each token in the input stream, and there may not be many global specifiers in the template.

Parser may be able to parse all or nearly all responses of known instruments.

Parser may be in a shared library

Parser may work on a variety of platforms, including, but not limited to: Win32, Linux, Mac OS X HEX and ASCII Modes Some aspects of the behavior of the instrument I/O assistant may be dependent upon whether the instrument response is a hexadecimal (HEX) data format representation of binary data or ASCII data format. If the instrument response is in HEX, then the operation of the instrument I/O assistant may be described as being in HEX mode. Likewise, if the instrument response is in ASCII, then the operation of the instrument I/O assistant may be described as being in ASCII mode. The instrument I/O assistant may automatically detect whether the instrument response is in HEX or ASCII, or alternatively the user may be able to specify whether the instrument response is in HEX or ASCII. In one embodiment, a user interface item 216 as illustrated in FIG. 3 may allow the user to toggle between HEX and ASCII mode.

HEX Mode

Figure 5:
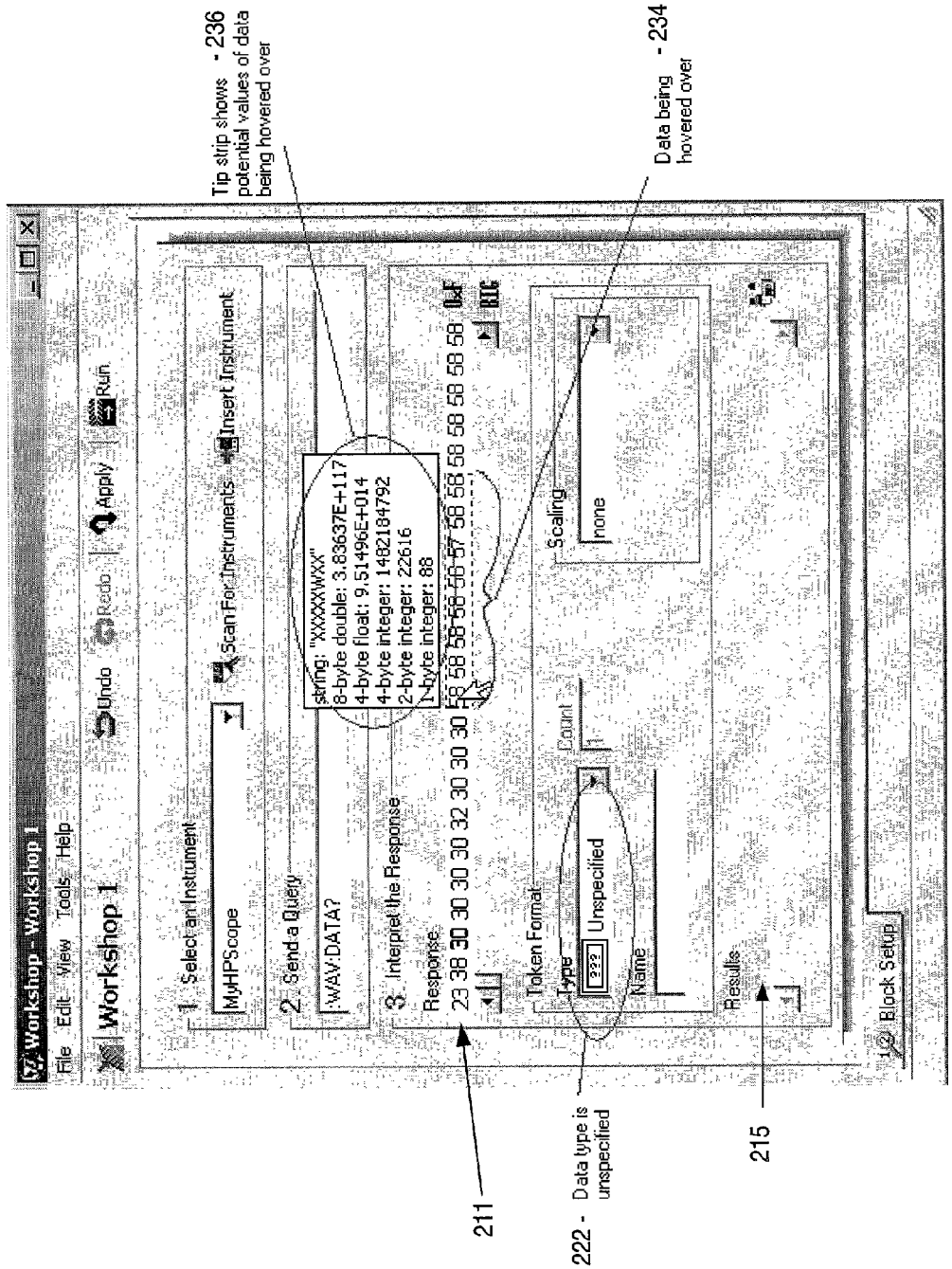
FIG. 5 illustrates an exemplary instrument I/O assistant User Interface (UI) according to one embodiment in HEX mode and shows a user "hovering" the cursor over a region and a corresponding tip-strip.
Figure 6:
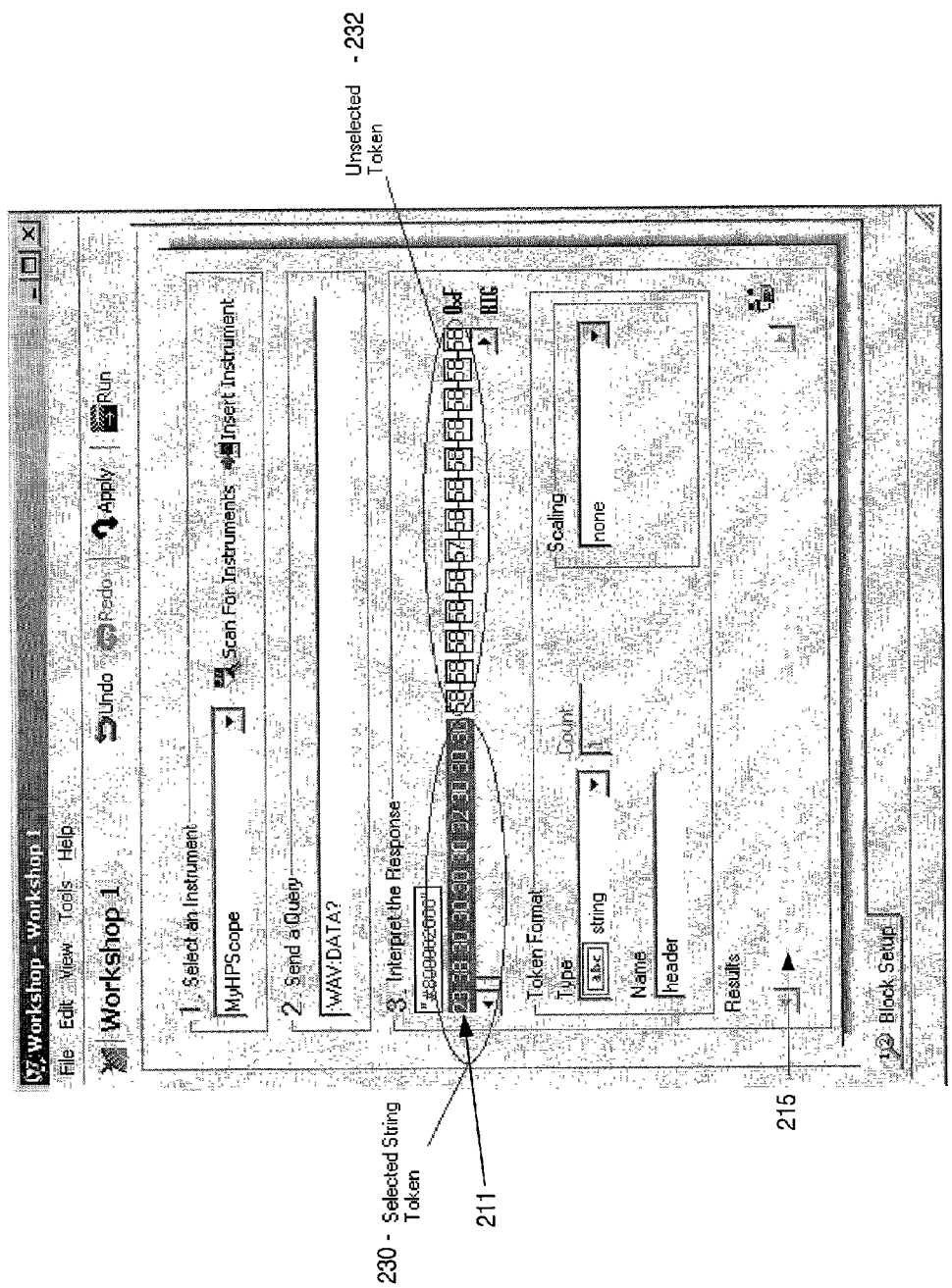
FIG. 6 illustrates an exemplary instrument I/O assistant User Interface (UI) according to one embodiment in HEX mode and shows a selected region specified as a string token.

FIGS. 4–6 illustrate an embodiment of the instrument I/O assistant UI 200 in HEX mode. In HEX mode, numeric tokens are interpreted in terms of their binary representation. The following describes an embodiment of a mechanism that may be used by the instrument I/O assistant in HEX mode to find and select strings and multi-byte sized data in an instrument response. Note that while FIGS. 4–6 and the following description show the response as displayed in a hexadecimal format, other numerical formats (e.g. binary, octal, decimal, etc.) may also be used to display the response. In one embodiment, the user may be able to choose between two or more numerical formats to display numerical data.

As illustrated in embodiments illustrated in FIGS. 4–6, a HEX instrument response may be displayed in a response field 211 of an exemplary instrument I/O assistant UI 200 as a series of HEX bytes separated by spaces. As illustrated by the exemplary instrument I/O assistant UI 200 in FIG. 5, the user may "hover" over the instrument response, and the mechanism may visually select the largest of a region 236 of the response (e.g. a 1, 2, 4, or 8 byte region). The region 236 may be calculated starting at the current mouse position (in FIG. 5, the cursor over the first 0-58 of the response) and terminating either at the end of the instrument response or at the beginning of the next token. A bounding rectangle, color fill, and/or other indicator may be used to visually indicate the region 234 selected from the current hover position.

When a region is selected by hovering, a tip-strip 236 may be displayed above the selected region 234 showing the set of possible data types, and the value of the selected region for the possible data types. The data type may include data types that occupy the region and/or smaller portions thereof. The user may then select the data type for the region 234 from the tip-strip 236.

When the user specifies a token's data type, the instrument response may be graphically annotated to show the selected token 230 as illustrated by the exemplary instrument I/O assistant UI 200 in FIG. 6. In one embodiment, this may be done with a bounding rectangle and/or color fill that represents the data type. Other methods may be used to graphically annotate the selected token 230. Note that one or more attributes 218 of the selected token may be displayed.

The user may specify the count of a selected token using the count control field 220 as illustrated by the exemplary instrument I/O assistant UI 200 in FIG. 4. In one embodiment, the count for tokens of the string type may not be specified. If the count is greater than one, then the token is interpreted as a contiguous set of values of a particular size and type starting at the selected token (e.g. an array). Once the user has specified a token as an array (that is, a count greater than 1), then the user may have the option to collapse the token so that all of the elements of the array appear as one token/element.

In one embodiment, the count control field 220 defaults to 1. In one embodiment, the control 220 may present other options such as the amount of available space divided by the size of the currently selected token. In one embodiment, the count may be set to the value of a named token that was previously specified by the user and that precedes the selected token. When the count is set to a named token, the mechanism uses the value of the named token as the count value. When the user specifies a count that evaluates to a number greater than one, the instrument response string is graphically annotated to show the individual elements of the set connected together.

The user may remove the specification for a token. To accomplish this, for example, the user may select the token and press the delete or backspace key. Other methods may be used to remove the specification for a token.

One embodiment may provide the user with the ability to slide the token specification a byte at a time over the instrument response 211 within the available space. When sliding the token, a tip-strip 236 may slide along with it. The tip strip 236 may display the set of possible data types and the value of the current region for the possible data types.

One embodiment may provide the user with the ability to resize a string token. This may be accomplished, for example, by allowing the user to grab the edge of a string token's bounding rectangle and enlarge or shrink the rectangle a byte at a time bounded by the available space. The minimum size of a string token is one character.

ASCII Mode

Figure 7:
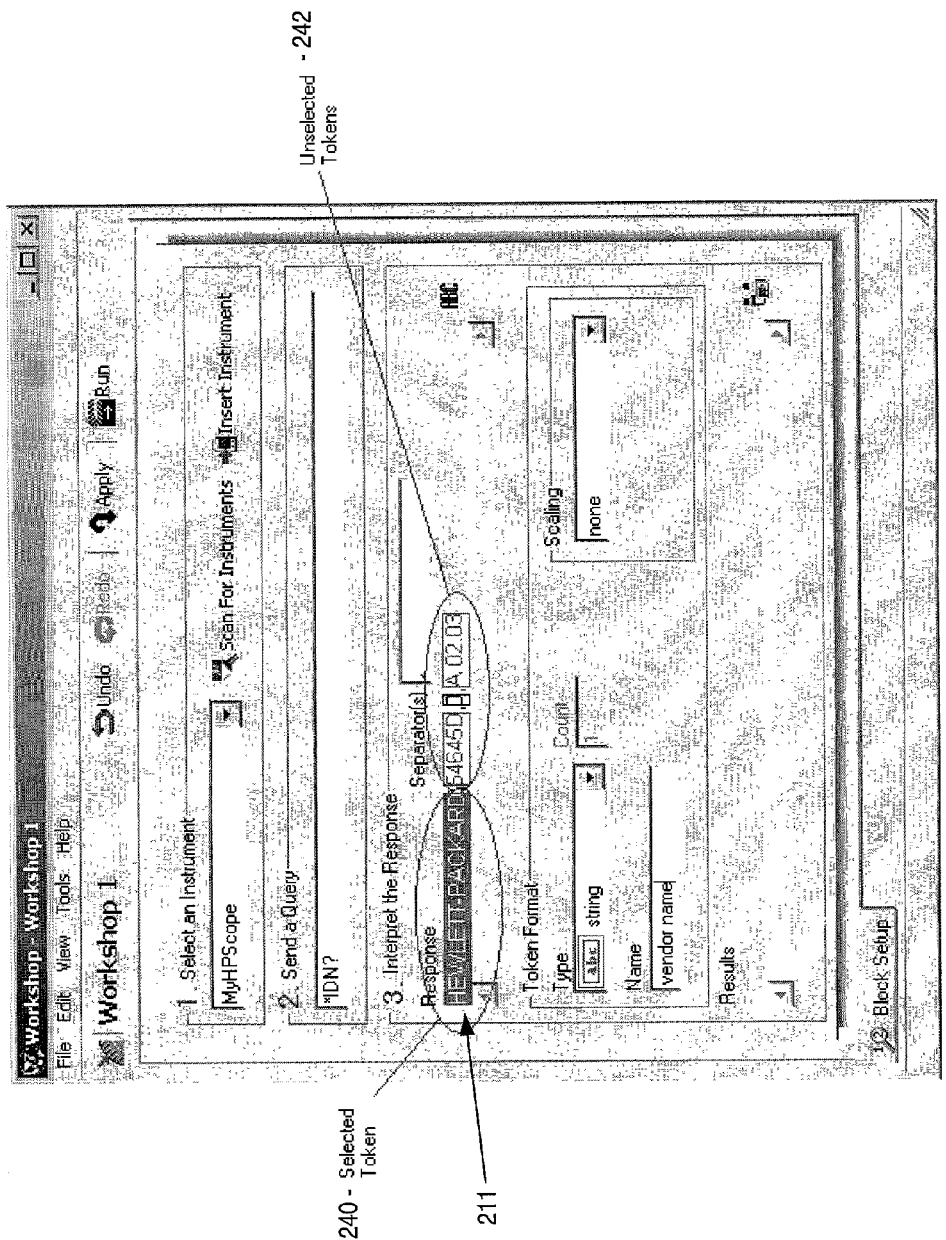
FIG. 7 illustrates an exemplary instrument I/O assistant User Interface (UI) according to one embodiment in ASCII mode and shows a selected region specified as a string token.
Figure 8:
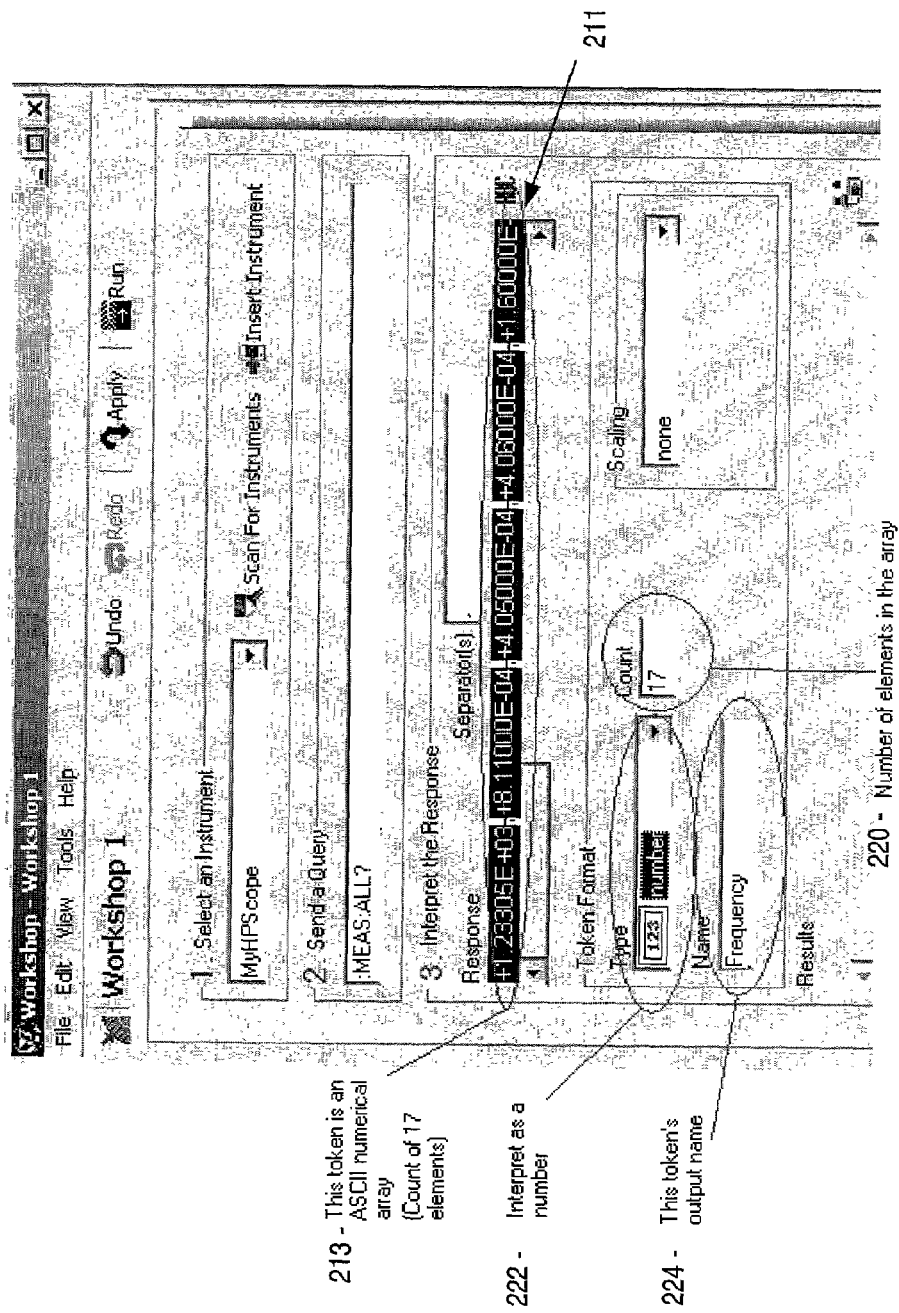
FIG. 8 illustrates an exemplary instrument I/O assistant User Interface (UI) according to one embodiment in ASCII mode and shows a selected region specified as an ASCII numerical array token.

FIGS. 3, 7 and 8 illustrate embodiments of an exemplary instrument I/O assistant UI 200 in ASCII mode. ASCII mode may be used to find and select alphanumeric strings and numbers in an instrument response. In ASCII mode, the user may select an area of the instrument response 211 and it is automatically interpreted as either a number such as token 212 of FIG. 3 or as a string such as token 240 of FIG. 7. The user may use a hovering technique such as that described for HEX mode to select an area or region of the response 211 to be tokenized. To assist in parsing the instrument response, the user may specify one or more separators or delimiters. For example, the comma is selected as a separator in field 214 of FIGS. 3, 7 and 8. When a separator is supplied, the instrument response 211 is automatically tokenized based on the separator(s). The separators are not included in the tokens.

If the selected region contains a base ten integer or real number, it is automatically interpreted as a number, but the user can choose to represent it as a string, for example, by changing the type 222 attribute as illustrated in FIG. 3. As illustrated in FIG. 8, if the token is a number, then the user may provide a count 220. When specifying a count greater than one, the user may also specify a separator 214, and the specified separator may follow each of the ASCII number representations in the response string 211. The token may then be represented as an ASCII enumerated array 213. Once the user has specified a token as an array (that is a count greater than 1), then the user has the option to "collapse" the token so that all of the elements of the array appear as only one token/element.

Code Creation

The instrument I/O assistant may provide the ability to create code for later use in interfacing with message-based instruments. The results of the ASCII and/or HEX token specification as described above may be used to automatically create a text-based (e.g. C, C++, .NET) and/or graphical code (e.g. a LabVIEW graphical code object that can be included in a virtual instrument) that may be used to programmatically perform the same functions as the instrument I/O assistant mechanism allowed the user to achieve interactively. These functions may include communicating with an identified instrument, sending command(s) to the identified instrument, and reading back responses from the instrument, and parsing the received response (for display or for other uses), among others. The instrument I/O assistant may provide the ability to create code to call and execute the saved configuration from a graphical language and/or a text-based language.

The saved code for one query and response may be referred to as a query block. A user may use the instrument I/O assistant to perform the above functions one or more times to generate a series of one or more query blocks which may be combined into a task. The task may then be executed, or alternatively code may be generated to execute the task.

In instrument control application programs such as Lab-VIEW, the instrument I/O assistant mechanism may be accessed as graphical primitive that executes a saved configuration. The primitive takes the name of a saved configuration that can change its set of outputs based on the outputs that the saved configuration generates. In instrument control application programs such as LabVIEW, the instrument I/O assistant mechanism may be accessed as a "block" that brings up an instrument I/O assistant wizard and automatically generates the code (e.g. LabVIEW code) from instrument I/O assistant into the block.

FIG. 9—Flowchart

Figure 9:
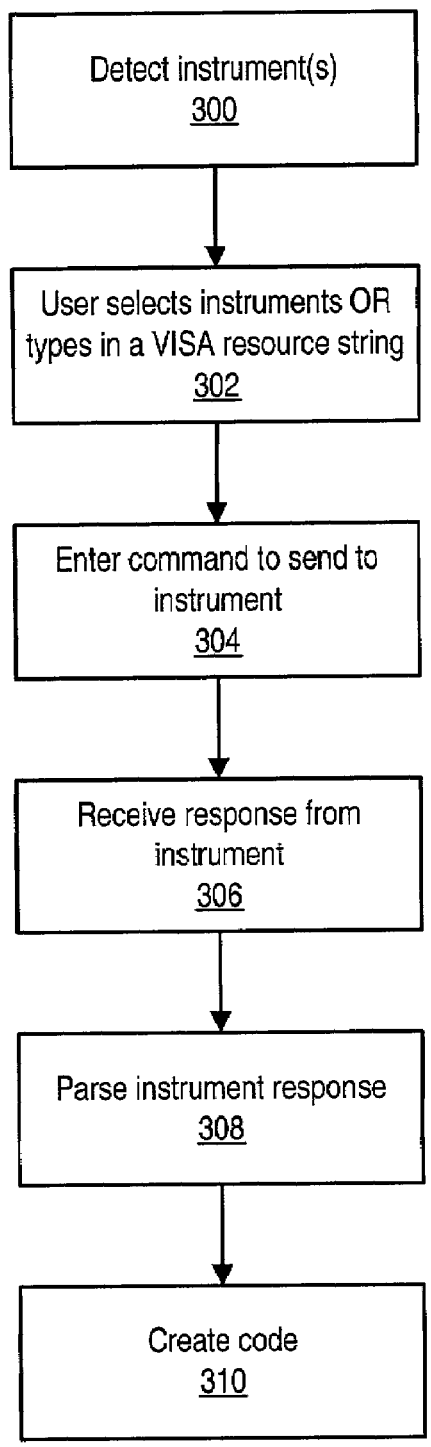
FIG. 9 is a flowchart of a method of querying message-based instruments, parsing the responses, and generating code that encapsulates the connection/communication with the instrument and the parsing of the response according to one embodiment.

FIG. 9 is a flowchart of a method of querying message-based instruments, parsing the responses, and generating code that encapsulates the connection/communication with the instrument and the parsing of the response according to one embodiment. As indicated at 300, one or more message-based instruments connected to a system may be detected. The instrument I/O assistant may automatically scan for message-based instruments coupled to the system within which the instrument I/O assistant is executing. The instrument I/O assistant UI may provide a control that allows the user to initiate a scan for message-based instruments. As indicated at 302, the user may scroll through and select an instrument from a list of detected instruments, or may otherwise specify a particular instrument to be communicated with, for example by entering a VISA resource string.

As indicated at 304, the user may then enter a command (e.g. query) to send to the selected instrument. In one embodiment, the user may enter the command by typing it in to a query field. In one embodiment, if the instrument I/O assistant can determine the instrument type (e.g. DMM, scope, arbitrary waveform (arb)/function generator, counter, etc.), or alternatively if the user specifies the instrument type, then syntax completion and suggestions, for example according to the SCPI standard, may be provided to the user. In other words, syntax completion and suggestions may appear as the user types in a command to the instrument. In one embodiment, instrument vendors and/or third parties may provide a file for a specific instrument that describes the command syntax of the instrument. This file may then be used by the instrument I/O assistant in providing syntax information to the user. If such a file exists, then the standard SCPI syntax completion may be replaced with syntax completion based on the custom file. After entering the command, the user may select a user interface item to cause the command to be sent the instrument.

As indicated at 306, the instrument I/O assistant may receive a response from the instrument after the command is sent. The response from the instrument may comprise instrument data represented as a binary or ASCII string. In one embodiment, the user may have the option of toggling the representation of the response data between binary and ASCII representations. Data in ASCII representation may comprise a sequence of strings, and the user may specify a delimiter for the sequence.

As indicated at 308, the received response may then be parsed. In one embodiment, the instrument I/O assistant may "pre-parse" instrument responses. Using parsing, for example, instead of a string of ASCII characters and binary numbers, the user will see the actual number(s) corresponding to a voltage reading. If the pre-parsing does not interpret the instrument response correctly, then the user may interactively and graphically vary how the response string is parsed. Characteristics associated with instrument command strings and response strings that may be set or changed by the user in order to define the desired command/response include, but are not limited to, data type, binary/text format, endianness, tokens/sequences, scaling, output data (waveforms, etc.), and headers on/off.

In one embodiment, the user may operate to graphically parse the response. Stated another way, the user may graphically configure the way in which the response is parsed. For example, the user may graphically position an icon over respective portions of the data to delineate different portions of the data as tokens. In one embodiment, the user may position or size an icon, such as a transparently colored lens icon that spans over a portion of the response data, and then the user may highlight the icon, thus selecting the data for tokenization. The data underneath the icon (e.g. a lens icon) is set apart as a token. In one embodiment, the appearance (e.g. color and/or texture) of the icon (e.g. a transparent lens icon) may be used to specify the data type of the token. As the user scrolls through to parse the rest of the data in the response, the data may maintain its highlighted color to indicate that it is tokenized. For every token in the data response, the user may be able to specify the data type to interpret the token, a count to specify a sequence or array of values, a delimiter for an array of values, the data type that the instrument I/O assistant may use to output the data, scaling parameters for that token, and a name for the output parameter, among other characteristics.

As indicated at 310, the instrument I/O assistant may provide the ability to create code for later use in interfacing with message-based instruments. The results of the token specification as described above may be used to automatically create a text-based (e.g. C, C++, .NET) and/or graphical code (e.g. a LabVIEW graphical code object that can be included in a virtual instrument) that may be used to programmatically perform the same functions as the instrument I/O assistant mechanism allowed the user to achieve interactively. These functions may include communicating with an identified instrument, sending command(s) to the identified instrument, reading back responses from the instrument, and parsing the received response (for display or for other uses), among others. The instrument I/O assistant may also provide the ability to create code to call and execute the saved configuration from a graphical language and/or a text-based language. The saved code for one query and response may be referred to as a query block. A user may use the instrument I/O assistant to perform the above functions one or more times to generate a series of one or more query blocks which may be combined into a task. The task may then be executed, or alternatively code may be generated to execute the task.

FIG. 10—Flowchart

Figure 10:
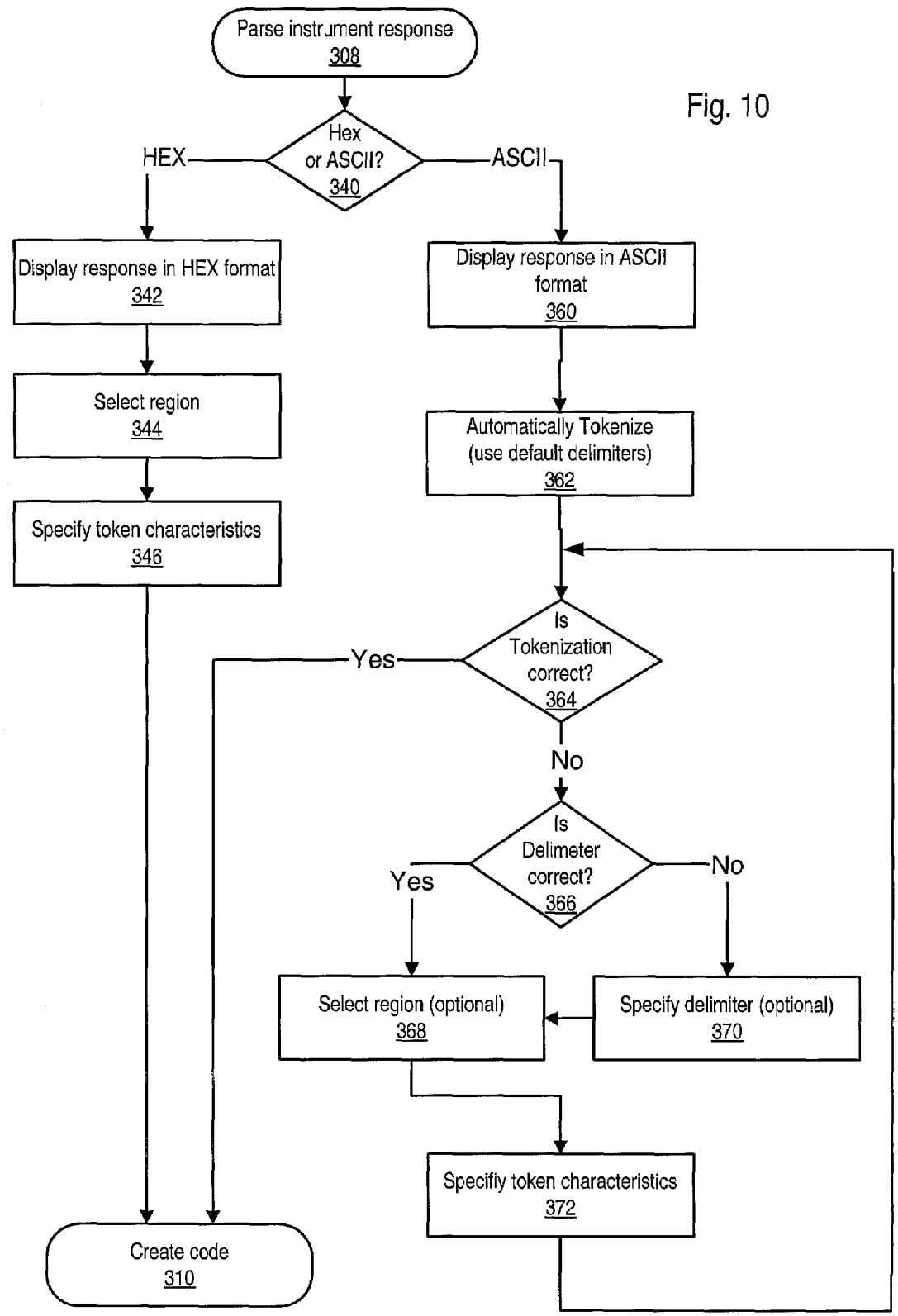
FIG. 10 is a flowchart expanding on the parsing of the response and showing the different aspects of the parsing depending upon response type (e.g. HEX or ASCII) according to one embodiment.

FIG. 10 is a flowchart expanding on the parsing of the response as indicated at 308 of FIG. 9. Some aspects of the behavior of the instrument I/O assistant during parsing may be dependent upon whether the instrument response is in hexadecimal (HEX) or ASCII. As indicated at 340, the instrument I/O assistant may determine if the response is HEX or ASCII. The instrument I/O assistant may automatically detect whether the instrument response is in HEX or ASCII, or alternatively the user may be able to specify whether the instrument response is in HEX or ASCII.

If the response is in HEX, the response may be displayed in a HEX format as indicated at 342. In HEX mode, numeric tokens are interpreted in terms of their binary representation. Note that other numerical formats may be used to display the numerical data. In one embodiment, the HEX instrument response may be displayed in a response field of an instrument I/O assistant UI as a series of HEX bytes separated by spaces. As indicated at 344, the user may then select a region to be tokenized. The user preferably selects a region to be tokenized by manipulating an icon in the display, such as by using a pointer device, e.g. a mouse, trackball, joystick, touchpad, etc. In one embodiment, the user may "hover" a mouse cursor or other icon over the instrument response, and the mechanism may visually select the largest of a region of the response (e.g. a 1, 2, 4, or 8 byte region). The region may be calculated starting at the current mouse position and terminating either at the end of the instrument response or at the beginning of the next region. A bounding rectangle, color fill, and/or other indicator may be used to visually indicate the region selected from the current hover position.

As indicated at 346, after selecting the region to be tokenized, various characteristics of the token may be specified. Characteristics of the token may be automatically determined by the instrument I/O assistant or alternatively may be specified by the user through the instrument I/O assistant user interface. In one embodiment, when a region is selected by hovering as described above, a tip-strip may be displayed above the selected region showing the set of possible data types, and the value of the selected region for the possible data types. The data types may include data types that occupy the region and/or smaller portions thereof. The user may then select a data type for the region from the tip-strip.

One embodiment may provide the user with the ability to slide the token specification a byte at a time over the instrument response within the available space. When sliding the token specification, the tip-strip may slide along with it. The tip strip may display the set of possible data types and the value of the current region for the possible data types.

One embodiment may provide the user with the ability to resize a string token. This may be accomplished, for example, by allowing the user to grab the edge of a string token's bounding rectangle and enlarge or shrink the rectangle a byte at a time bounded by the available space. The minimum size of a string token is one character.

When the user specifies a token's data type, the instrument response may be graphically annotated to show the selected token. In one embodiment, this may be done with a bounding rectangle and/or color fill that represents the data type. Other methods may be used to graphically annotate the selected token. One or more attributes of the selected token may be displayed in fields of the instrument I/O assistant user interface.

The user may specify the count of a selected token. In one embodiment, the count for tokens of a string type may not be specified. If the count is greater than one, then the token may be interpreted as a contiguous set of values of a particular size and type starting at the selected token (e.g. an array). Once the user has specified a token as an array (that is, the token has a count greater than 1), then the user may have the option to collapse the token so that all of the elements of the array appear as one token/element. In one embodiment, the count defaults to 1. In one embodiment, the count may be set to the value of a named token that was previously specified by the user and that precedes the selected token. When the count is set to a named token, the value of the named token may be used as the count value for the currently selected token. When the user specifies a count that evaluates to a number greater than one, the instrument response string may be graphically annotated to show the individual elements of the set connected together.

Note that the tokenization of values in a HEX response as described above may be repeated one or more times for each value that the user wished to tokenize in the HEX response.

If the response is in ASCII, the response may be displayed in an ASCII format as indicated at 360. In ASCII mode, the instrument I/O assistant user interface may be used to find and select alphanumeric strings and numbers in the instrument response. As indicated at 362, the response may be automatically tokenized using default delimiters. The user may examine the tokenized response to determine if the automatic tokenization is correct as indicated at 364. If the automatic tokenization is correct, then the user may accept the tokenization and proceed to creating the code at 310.

If the user determines that the automatic tokenization is not correct, then the user may first determine if the delimiter (i.e. separator) used in automatic tokenization is correct as indicated at 366. If the user determines that the delimiter is not correct, then the user may optionally specify a delimiter as indicated at 370 to assist in parsing the instrument response. For example, a comma may be entered as a delimiter. If the user supplies a delimiter, the instrument response may be automatically re-tokenized based on the delimiter. In one embodiment, the delimiters are not included in the tokens.

As mentioned, if the user determines that the delimiter is correct, or if the user enters a corrected delimiter, then the instrument response may be automatically tokenized using the delimiter (and, if applicable, one or more other attributes of the token, which may be automatically set or optionally may be specified by the user). Automatic tokenization may include the instrument I/O assistant automatically selecting regions in the response message to be tokenized based upon the delimiters in the response message. Optionally, the user may manually select a region or regions of the instrument response as indicated at 368 to override the region selection of the automatic tokenization. In ASCII mode, the user may select an area or region of the instrument response, and the region may be automatically interpreted as either an ASCII number or as a string. The user may use a hovering technique such as that described for HEX responses at 344 to select an area or region of the response to be tokenized.

As indicated at 372, after a region is selected as a token, various characteristics of the token may be specified. If the selected region contains a base ten integer or real number, it may be automatically interpreted as a number, but the user may choose to represent it as a string, for example, by changing the type attribute. If the token is a number, then the user may provide a count. When specifying a count greater than one, the user may also specify a separator, and the specified separator may follow each of the ASCII number representations in the response string. The token may then be represented as an ASCII enumerated array. Once the user has specified a token as an array (that is, the token has a count greater than 1), then the user may optionally "collapse" the token so that all of the elements of the array appear as one token/element.

Note that the tokenization of values in an ASCII response as described above may be repeated one or more times for each value that the user wished to tokenize in the ASCII response.

The methods as described in FIGS. 9–10 may be implemented in software, hardware, or a combination thereof. The order of method may be changed, and various steps may be added, reordered, combined, omitted, modified, etc.

Workshop Framework

In one embodiment, a "Workshop Framework" may be used to save tasks made up of query blocks as the user creates them, and the created tasks may then be reused within instrument I/O assistant. The term "Workshop Framework" refers to a graphical user interface wherein tasks or query blocks can be graphically assembled into a script or program. For example, the user can use the Workshop Framework to graphically select a plurality of query blocks (e.g. represented by icons) and configure the icons in a desired order of execution, thereby creating a task. For example, the user may create a trigger task for an HP 54645 scope, and save it. The task will then show up in a block palette menu from where the user may select query blocks and/or tasks. The user may then reuse the trigger task within another task. By persisting tasks, users may be able to reuse their own tasks, and also may share their tasks with other users. Tasks may be collected and organized for distribution, for example through a website.

Figure 11:
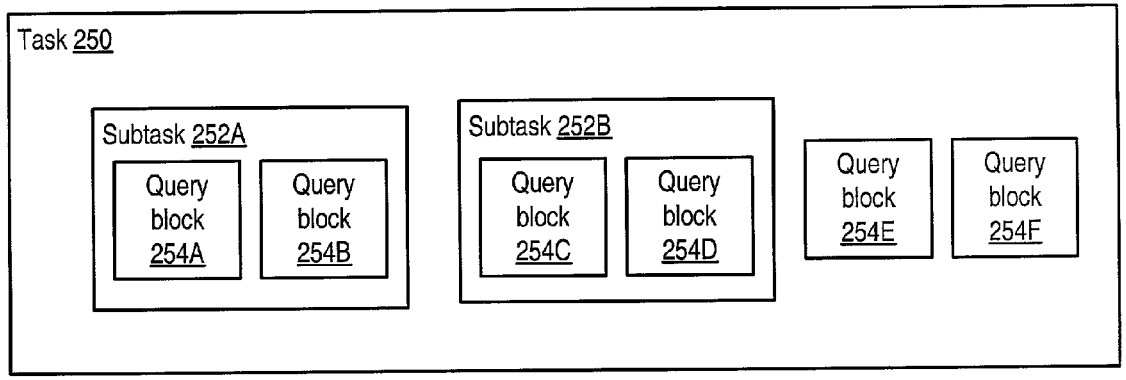
FIG. 11 illustrates a task 250 with nested subtasks and query blocks according to one embodiment.

As previously described, a single task may include any number of query blocks, and may include one or more other tasks as "subtasks". FIG. 11 illustrates a task 250 with nested subtasks and query blocks according to one embodiment. Each subtask 252 includes one or more query blocks 254. Task 250 may also include one or more query blocks 254. Note that subtasks 252 may also include nested subtasks 252. A task may also query certain data from the instrument "silently", without the user's knowledge, to determine the state of the instrument. For example, a task may query the instrument to determine if headers are turned on or off so that the parser is aware of how to handle headers in the response. Some instruments may support similar queries to determine other characteristics such as byte ordering. In one embodiment, these queries to determine the state of the instrument may be done automatically in a task so that user does not have to explicitly add these queries as part of their task.

Figure 12:
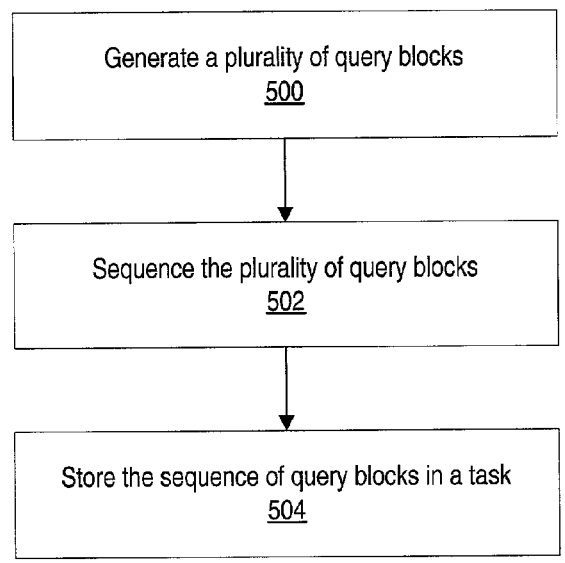
FIG. 12 is a flowchart illustrating a method of sequencing query blocks in tasks according to one embodiment.

FIG. 12 is a flowchart illustrating a method of sequencing query blocks in tasks according to one embodiment. As indicated at 500, a plurality of query blocks may be generated in response to user input. Each query block may be executable within an instrumentation system to connect with a message-based instrument, send a query message to the message-based instrument, receive a response to the query message from the message-based instrument, parse the response, and output results of parsing the response. As indicated at 502, the user may graphically sequence the plurality of query blocks in a desired order of execution, and store the sequenced plurality of query blocks in a task as indicated at 504.

Figure 13:
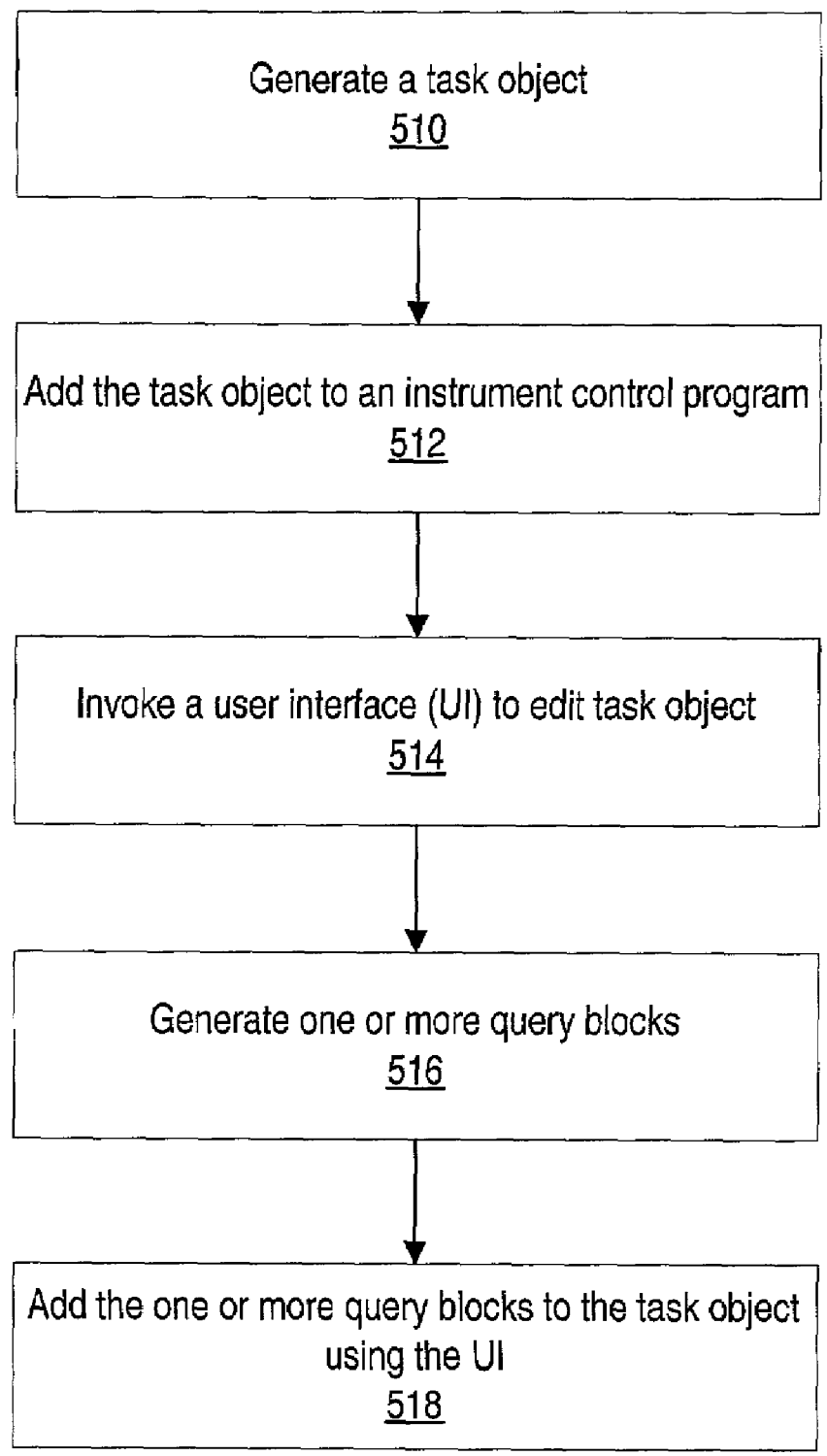
FIG. 13 is a flowchart illustrating a method of generating a task object and graphically editing the generated task object according to one embodiment.

FIG. 13 is a flowchart illustrating a method of generating a task object and graphically editing the generated task object according to one embodiment. As indicated at 510, a task object may be generated in response to user input. The user may then graphically add the task object to an instrument control application program as indicated at 512. As indicated at 514, the user may invoke a user interface for graphically editing the task object. The user may then graphically generate one or more query blocks using the user interface as indicated at 516. Each query block may be executable within an instrumentation system to connect with a message-based instrument, send a query message to the message-based instrument, receive a response to the query message from the message-based instrument, parse the response, and output results of said parsing the response. As indicated at 518, the user may then graphically add the one or more query blocks to the task object.

NI-GPIB and NI-VISA, for example, both offer tools for reporting errors descriptively and monitoring the bus and API calls. These tools include, but are not limited to, NI Spy, GPIB Analyzer, and the error reporting in VISAIC. In one embodiment, the instrument I/O assistant may include tools that utilize these technologies and incorporate them into a single application. In one embodiment, the technologies may be provided as separate tabs in the instrument I/O assistant.

The instrument I/O assistant workshop may maintain a repository of common error responses so that if an instrument returns an error number, then the instrument I/O assistant may interpret and display the error. For example, error number "113" may resolve to an "Undefined header" error. It is a common error to which users often fall victim. The instrument I/O assistant may display only descriptive human readable errors in lieu of numerics and non-descriptive strings like "Undefined Header."

In one embodiment, when the user saves a task that has been created, the task may be accessible in a query block palette menu in the instrument I/O assistant. Tasks may be organized hierarchically under the device that task belongs to in the query block palette menu. In one embodiment, when an already defined task is inserted into a new task, that task may not appear as one sequence block in the new task, but instead may be expanded into the one or more query blocks that compose the predefined task. The sequence corresponding to the inserted task may be annotated in the new task to illustrate that the inserted task has been expanded into its query blocks. If the user edits any of the query blocks that make up the inserted task, then the annotation may disappear and may lose the coupling with the inserted task. If the user edits a Task A, then a Task B that includes Task A may be automatically updated to include the changes to Task A. If the user changes one of the blocks annotated as part of Task A within Task B, then the tie between Task A and Task B may be lost.

Task Execution

Typically in the Workshop environment, a task may be run repetitively as the user interacts with the task. In the case of the instrument I/O assistant, task execution may need to be run in sequence only when a change has been made to a block that requires a run of the task. For example, a query block should not be executed while the user is typing in the command to be sent. The task may be executed only when the user "applies" the block. The task will not be run repetitively; it may only be run once when the user modifies the block.

Various embodiments may further include receiving, sending or storing instructions and/or data implemented in accordance with the foregoing description upon a carrier medium. Generally speaking, a carrier medium may include storage media or memory media such as magnetic or optical media, e.g., tape, disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method executable within an instrumentation system, comprising:
   sending a query message to a message-based instrument;
   receiving a response from the message-based instrument; and
   parsing the response, wherein said parsing comprises:
      displaying the response;
      graphically selecting a region of the displayed response in response to user input; and
      specifying one or more attributes of the selected region; wherein the selected region is configured in accordance with the specified attributes.

2. The method of claim 1, wherein said specifying one or more attributes of the selected region configures the selected region as a token in accordance with the specified attributes.

3. The method of claim 1, wherein the specified one or more attributes of the selected region include one or more of data type, byte ordering, position, size, count, name, and scaling.

4. The method of claim 1, further comprising, prior to said sending the query message, specifying the message-based instrument to receive the query message in response to user input.

5. The method of claim 4, wherein specifying the message-based instrument comprises selecting the message-based instrument from a list of two or more instruments coupled to the instrumentation system in response to user input.

6. The method of claim 1, further comprising:
   generating a query block in response to said parsing, wherein the query block comprises program instructions that are executable to perform said sending, said receiving, and said parsing; and
   storing the generated query block to memory.

7. The method of claim 6, wherein the query block is executable within the instrumentation system to interact with the selected message-based instrument to perform said sending, said receiving, and said parsing.

8. The method of claim 6, wherein the query block is a graphical object configured for use in a graphical programming environment.

9. The method of claim 6, wherein the query block is a text-based module configured for use in a textual programming environment.

10. The method of claim 6, further comprising:
    adding the query block to an instrument control application program;
    executing the instrument control application program; and
    executing the query block within the instrument control application program to interact with the selected message-based instrument to perform said sending, said receiving, and said parsing.

11. The method of claim 6, wherein said parsing generates one or more parsed instrument responses.

12. The method of claim 11, further comprising displaying at least a subset of the parsed instrument responses.

13. The method of claim 11, further comprising providing at least a subset of the parsed instrument responses to one or more other objects in the instrument control application program.

14. The method of claim 1, further comprising:
    repeating said sending, said receiving and said parsing for a plurality of query messages to the message-based instrument;
    generating a query block for each of the repetitions, wherein the query block comprises program instructions that are executable to perform said sending, said receiving, and said parsing as specified for the particular repetition; and
    adding the plurality of generated query blocks for each of the repetitions to a task in memory.

15. The method of claim 14, wherein the task comprises the plurality of query blocks in a sequence, and wherein the task is executable to execute the plurality of query blocks in the sequence.

16. The method of claim 14, wherein the task is a graphical object configured for use in a graphical programming environment.

17. The method of claim 14, wherein the task is a text-based module configured for use in a textual programming environment.

18. The method of claim 1, wherein the response is displayed in hexadecimal format.

19. The method of claim 1, wherein the response is displayed in ASCII format.

20. The method of claim 19, wherein the data format is one of hexadecimal and ASCII.

21. The method of claim 1, further comprising determining a data format of the response, wherein said displaying the response displays the response in accordance with the determined data format.

22. The method of claim 1, wherein said displaying the response displays the response in accordance with a data format, the method further comprising:
    after said specifying one or more attributes of the selected region, changing the displayed response to another data format in response to user input; and
    wherein the selected region is configured in accordance with the specified attributes after said changing.

23. The method of claim 1, further comprising tokenizing the response prior to said graphically selecting the region.

24. The method of claim 1, wherein the response is an ASCII response, wherein said displaying the response displays the response as one or more ASCII tokens generated by said tokenizing.

25. The method of claim 1, wherein said specifying the one or more attributes of the selected region is performed in response to user input.

26. An instrumentation system comprising:
    a computing device comprising:
        a processor; and
        a memory;
    a message-based instrument coupled to the computing device;
    a unit under test coupled to the message-based instrument;
    wherein the memory comprised in the computing device comprises program instructions executable within the computing device to:
        send a query message to the message-based instrument;
        receive a response from the message-based instrument; and
        parse the response;
    wherein, to parse the response, the program instructions are further executable to:
        display the response;
        graphically select one or more regions of the displayed response in response to user input;
        specify one or more attributes for each selected region; and
        configure each selected region as a token in accordance with the specified one or more attributes of the particular selected region.

27. The instrumentation system of claim 26, wherein the specified one or more attributes of each selected region include one or more of data type, byte ordering, position, size, count, name, and scaling.

28. The instrumentation system of claim 26, wherein the program instructions are further executable to specify the message-based instrument to receive the query message in response to user input.

29. The instrumentation system of claim 28, wherein, to specify the message-based instrument, the program instructions are further executable to select the message-based instrument from a list of two or more instruments coupled to the instrumentation system in response to user input.

30. The instrumentation system of claim 26, wherein the message-based instrument is one of one or more message-based instruments coupled to the computing device, wherein, prior to said sending the query message, the program instructions are further executable to detect the message-based instrument coupled to the device.

31. The instrumentation system of claim 26, wherein the program instructions are further executable to:
    generate a query block in response to said parsing, wherein the query block comprises program instructions that are executable to perform said sending, said receiving, and said parsing; and
    store the generated query block to the memory.

32. The instrumentation system of claim 31, wherein the query block is executable within the instrumentation system to:
    send the query message of the query block to the message-based instrument;
    receive the response from the message-based instrument;
    select one or more regions of the response; and
    configure each of the selected one or more regions as a token in accordance with the specified one or more attributes of the particular region.

33. The instrumentation system of claim 31, wherein the query block is a text-based module configured for use in a textual programming environment.

34. The instrumentation system of claim 31, wherein the query block is a graphical object configured for use in a graphical programming environment.

35. The instrumentation system of claim 31, wherein the program instructions are further executable to:
    add the query block to an instrument control application program stored in the memory;
    execute the instrument control application program; and
    execute the query block within the instrument control application program to interact with the selected message-based instrument to perform said sending, said receiving, and said parsing.

36. The instrumentation system of claim 35, wherein said parsing during execution of the query block generates a parsed instrument response.

37. The instrumentation system of claim 36, further comprising displaying the parsed instrument response.

38. The instrumentation system of claim 36, further comprising providing the parsed instrument response to one or more other objects in the instrument control application program.

39. The instrumentation system of claim 31, wherein the query block is configured to be exported to other instrumentation systems.

40. The instrumentation system of claim 26, wherein the program instructions are further executable to:
    repeat said sending, said receiving and said parsing for a plurality of query messages to the message-based instrument;
    generate a query block for each of the repetitions, wherein the query block comprises program instructions that are executable to perform said sending, said receiving, and said parsing as specified for the particular repetition; and
    add the plurality of generated query blocks for each of the repetitions to a task in the memory.

41. The instrumentation system of claim 40, wherein the task comprises the plurality of query blocks in a sequence, wherein the task is executable within the instrumentation system, and wherein, in said executing within the computer system, the task is configured to execute the plurality of query blocks in the sequence.

42. The instrumentation system of claim 40, wherein the task is configured to be exportable to other instrumentation systems.

43. The instrumentation system of claim 40, wherein the task is a text-based module configured for use in a textual programming environment.

44. The instrumentation system of claim 40, wherein the task is a graphical object configured for use in a graphical programming environment.

45. The instrumentation system of claim 26, wherein the response is displayed in a hexadecimal format.

46. The instrumentation system of claim 26, wherein the response is displayed in an ASCII format.

47. The instrumentation system of claim 26, wherein the message-based instrument is a GPIB instrument.

48. The instrumentation system of claim 26, wherein the message-based instrument is a serial instrument.

49. A computer-readable memory medium comprising program instructions executable within an instrumentation system, wherein the program instructions are executable to implement:
   sending a query message to a message-based instrument;
   receiving a response from the message-based instrument; and
   parsing the response, wherein said parsing comprises:
      displaying the response;
      graphically selecting a region of the displayed response in response to user input; and
      specifying one or more attributes of the selected region;
      wherein the selected region is configured in accordance with the specified attributes.

50. The computer-readable memory medium of claim 49, wherein said specifying one or more attributes of the selected region configures the selected region as a token in accordance with the specified attributes.

51. The computer-readable memory medium of claim 49, wherein the specified one or more attributes of the selected region include one or more of data type, byte ordering, position, size, count, name, and scaling.

52. The computer-readable memory medium of claim 49, wherein the program instructions are further executable to implement, prior to said sending the query message, specifying the message-based instrument to receive the query message in response to user input.

53. The computer-readable memory medium of claim 52, wherein, in said specifying the message-based instrument, the program instructions are further executable to implement selecting the message-based instrument from a list of two or more instruments coupled to the instrumentation system in response to user input.

54. The computer-readable memory medium of claim 49, wherein the program instructions are further executable to implement:
   generating a query block in response to said parsing, wherein the query block comprises program instructions that are executable to perform said sending, said receiving, and said parsing; and
   storing the generated query block to memory;
   wherein the query block is executable within the instrumentation system to interact with the selected message-based instrument to perform said sending, said receiving, and said parsing.

55. The computer-readable memory medium of claim 54, wherein the query block is a graphical object configured for use in a graphical programming environment.

56. The computer-readable memory medium of claim 54, wherein the query block is a text-based module configured for use in a textual programming environment.

57. The computer-readable memory medium of claim 54, wherein the program instructions are further executable to implement:
   adding the query block to an instrument control application program;
   executing the instrument control application program; and
   executing the query block within the instrument control application program to interact with the selected message-based instrument to perform said sending, said receiving, and said parsing.

58. The computer-readable memory medium of claim 49, wherein the program instructions are further executable to implement:
   repeating said sending, said receiving and said parsing for a plurality of query messages to the message-based instrument;
   generating a query block for each of the repetitions, wherein the query block comprises program instructions that are executable to perform said sending, said receiving, and said parsing as specified for the particular repetition; and
   adding the plurality of generated query blocks for each of the repetitions to a task in memory;
   wherein the task comprises the plurality of query blocks in a sequence, and wherein the task is executable to execute the plurality of query blocks in the sequence.

59. The computer-readable memory medium of claim 58, wherein the task is a graphical object configured for use in a graphical programming environment.

60. The computer-readable memory medium of claim 58, wherein the task is a text-based module configured for use in a textual programming environment.

61. The computer-readable memory medium of claim 49, wherein the response is displayed in one of a hexadecimal format and an ASCII format.

* * * * *